US010938246B2

(12) United States Patent
Moshfeghi

(10) Patent No.: US 10,938,246 B2
(45) Date of Patent: *Mar. 2, 2021

(54) METHOD AND APPARATUS FOR CHARGING A BATTERY-OPERATED DEVICE

(71) Applicant: Golba LLC, Rancho Palos Verdes, CA (US)

(72) Inventor: Mehran Moshfeghi, Rancho Palos Verdes, CA (US)

(73) Assignee: Golba, LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,910

(22) Filed: Feb. 18, 2020

(65) Prior Publication Data
US 2020/0185971 A1    Jun. 11, 2020

Related U.S. Application Data

(63) Continuation of application No. 16/436,824, filed on Jun. 10, 2019, now abandoned, which is a
(Continued)

(51) Int. Cl.
| | |
|---|---|
| *H02J 7/00* | (2006.01) |
| *H02J 50/12* | (2016.01) |
| *H02J 50/90* | (2016.01) |
| *H02J 50/80* | (2016.01) |
| *H04B 1/3827* | (2015.01) |
| *H02J 50/20* | (2016.01) |

(Continued)

(52) U.S. Cl.
CPC .............. *H02J 50/12* (2016.02); *H02J 7/025* (2013.01); *H02J 50/20* (2016.02); *H02J 50/80* (2016.02); *H02J 50/90* (2016.02); *H04B 1/3838* (2013.01); *H01Q 3/005* (2013.01); *H04B 7/26* (2013.01)

(58) Field of Classification Search
CPC ...................................................... H02J 50/12
USPC ...................................................... 320/108
See application file for complete search history.

(56) References Cited

U.S. PATENT DOCUMENTS

| | | | | |
|---|---|---|---|---|
| 5,504,415 | A | * | 4/1996 | Podrazhansky ....... H02J 7/0016 320/118 |
| 5,528,122 | A | * | 6/1996 | Sullivan ................ H02J 7/0018 320/118 |

(Continued)

*Primary Examiner* — Yalkew Fantu
(74) *Attorney, Agent, or Firm* — Farjami & Farjami LLP

(57) ABSTRACT

There is provided a battery-operated device that include a battery, an electronic circuitry configured to be powered by the battery, and a converter configured to receive energy from any of a plurality of authorized chargers, and generate power from the energy for charging the battery using the power. The battery-operated device is configured to receive a charger identification from a charger, and determine whether the charger identification is in a list of charger identifications belonging to the plurality of authorized chargers. The battery-operated device is further configured to, in response to determining that the charger identification is in the list of charger identifications receive the energy from the charger, generate, using the converter, the power from the energy received from the charger, charge the battery using the power received from the converter, and use the battery to power the electronic circuitry.

20 Claims, 24 Drawing Sheets

Related U.S. Application Data continuation of application No. 15/610,379, filed on May 31, 2017, now Pat. No. 10,355,531, which is a continuation of application No. 15/263,629, filed on Sep. 13, 2016, now Pat. No. 9,847,670, which is a continuation of application No. 14/223,841, filed on Mar. 24, 2014, now Pat. No. 9,608,472, which is a continuation of application No. 12/979,254, filed on Dec. 27, 2010, now Pat. No. 8,686,685.

(60) Provisional application No. 61/290,184, filed on Dec. 25, 2009.

(51) Int. Cl.
*H02J 7/02* (2016.01)
*H01Q 3/00* (2006.01)
*H04B 7/26* (2006.01)

(56) References Cited

U.S. PATENT DOCUMENTS

| | | | | |
|---|---|---|---|---|
| 6,867,567 B2* | 3/2005 | Yokota | ............... | H02J 7/0047 320/134 |
| 2004/0135544 A1* | 7/2004 | King | ............... | B60L 53/11 320/116 |
| 2004/0135546 A1* | 7/2004 | Chertok | ............... | B60L 58/22 320/118 |
| 2011/0127953 A1* | 6/2011 | Walley | ............... | H02J 7/025 320/108 |

* cited by examiner

METHOD AND APPARATUS FOR CHARGING A BATTERY-OPERATED DEVICE

CLAIM OF BENEFIT TO RELATED APPLICATIONS

The present application is a continuation application of U.S. patent application Ser. No. 16/436,824, entitled "Portable Pad for Wireless Charging," filed Jun. 10, 2019, which is a continuation application of U.S. patent application Ser. No. 15/610,379, entitled "Portable Pad for Wireless Charging," filed May 31, 2017, now U.S. Pat. No. 10,355,531, which is a continuation application of U.S. patent application Ser. No. 15/263,629, entitled "Selective Wireless Charging of Authorized Slave Devices," filed Sep. 13, 2016, now U.S. Pat. No. 9,847,670, which is a continuation application of U.S. patent application Ser. No. 14/223,841, entitled "Method and Apparatus for Wirelessly Transferring Power and Communicating with One or More Slave Devices," filed Mar. 24, 2014, now U.S. Pat. No. 9,608,472, which is itself a continuation application of U.S. patent application Ser. No. 12/979,254, entitled "Method and apparatus for wirelessly transferring power and communicating with one or more slave devices," filed Dec. 27, 2010, now U.S. Pat. No. 8,686,685. U.S. patent application Ser. No. 12/979,254 claims the benefit of and priority to U.S. Provisional Patent Application 61/290,184, entitled, "Master Device that Wirelessly Transfers Power and Communicates with a Plurality of Slave Devices," filed Dec. 25, 2009. The contents of all of the above-identified applications are hereby incorporated fully by reference into the present application.

BACKGROUND

Induction is a common form for wireless power. Non resonant induction systems like transformers use a primary coil to generate a magnetic field. A secondary coil is then placed in that magnetic field and a current is induced in the secondary coil. Induction, however, has the disadvantage that the receiver must be very close to the transmitter in order to inductively couple to it. At large distances induction wastes most of the energy in the resistive losses of the primary coil. Resonant inductive coupling improves energy transfer efficiency at larger distances by using two coils that are highly resonant at the same frequency. However, both non-resonant and resonant induction wireless power methods are non-directive and irradiate the space around them. This can be disadvantage in some situations since there are regulations that limit human exposure to alternating magnetic fields because of concern for biological impacts on the users. Also, since they use low frequencies (KHz to 7 MHz) they cannot be used for high speed communication.

BRIEF SUMMARY

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

Some embodiments provide a wireless transmitter that uses radio frequencies (RF) with small high gain directive antennas and high frequency radio waves or electromagnetic induction to charge one or more receiving devices and then communicate with them. Wireless communication is convenient because it allows devices to connect to each other without wires. Wireless power is convenient because it removes the need for wires and connectors. This invention combines these two aspects together.

Some embodiments use radio frequency (RF) instead of resonant electromagnetic induction to charge and communicate with slave devices. Throughout this specification the 60 GHz spectrum is used for describing the RF charging aspect of this invention. However, 60 GHz is only one special case of using higher frequencies for implementing this invention. In the U.S. the 60 GHz spectrum band can be used for unlicensed short range data links (1.7 km) with data throughputs up to 2.5 Gbits/s. Higher frequencies such as the 60 GHz spectrum experience strong free space attenuation. The smaller wavelength of such high frequencies also enables the use of small high gain antennas with small beam widths. The combination of high attenuation and high directive antenna beams provides better frequency reuse so that the spectrum can be used more efficiently for point-to-multipoint communications. For example, a larger number of directive antennas and users can be present in a given area without interfering with one another, compared to less directive antennas at lower frequencies. Small beam width directive antennas also confine the electromagnetic waves to a smaller space and therefore limit human exposure. The higher frequencies also provide more bandwidth and allow more information to be wirelessly transmitted. Thus, the same antenna can be used to for power generation and communication.

There are several standards bodies that are using high frequencies such as 60 GHz. These include WirelessHD, WiGig, and WiFi IEEE 802.11ad. The WirelessHD specification is based on the 7 GHz of continuous bandwidth around the 60 GHz radio frequency and allows for digital transmission of uncompressed high definition (HD) video, audio and data. It is aimed at consumer electronics applications and provides a digital wireless interface for file transfers, wireless display and docking, and lossless HD media streaming for ranges up to 10 meters. Theoretically it can support data rates as high as 25 Gbit/s. The 60 GHz band usually requires line of sight between transmitter and receiver because of high absorption. The WirelessHD specification gets around this limitation by using beam forming at the transmitter and receiver antennas to increase effective power of the signal.

The WiGig standard (short for the "Wireless Gigabit Alliance") is also promoting high speed wireless communication over the unlicensed 60 GHz spectrum and is a competing standard to WirelessHD. The WiGig standard is also taking advantage of the high absorption of 60 GHz that limits signal propagation and reduces interference with other wireless systems.

IEEE 802.11ad is also under development by the IEEE task group for the upcoming 60 GHz standard. This is essentially a faster version of the IEEE 802.11 standard that uses the 60 GHz band. However, because it uses a new spectrum it will not be backward compatible with existing WiFi.

Wireless USB is a standard which does not use 60 GHz. Wireless USB uses the Ultra-wideBand (UWB) radio platform that operates in the 3.1 to 10.6 GHz frequency and can transmit 480 Mbit/s at distances up to 3 meters and 110 Mbit/s at up to 10 meters. While the goal of 802.11 family (802.11*) WiFi is to replace Ethernet cables and provide wireless Internet access, the goal of Wireless USB is to remove the cables from USB based PC peripherals. Wireless USB can be used for printers, scanners, digital cameras, MP3 players, game controllers, hard disks, and flash drives. Both WirelessHD and WiGig are competing in some aspects with the Wireless USB standard. Inductive Charging in some embodiments is performed at lower frequencies such as frequencies of less than 100 MHz, whereas RF frequencies used in some embodiments is greater than 900 MHz or 1 GHz. The higher the RF frequencies, the smaller the wavelength and hence the smaller the size of the antenna.

None of the above standards address charging slave devices before communicating with them. Instead they assume that the slaves have access to some power source such as AC power or a battery. In some embodiments a master device uses one or more directional antennas or uses antenna array beam forming to transmit high frequency RF signals to one or more slave devices to power them up or charge their batteries. By using the directional antennas or using antenna array beam forming, these embodiments concentrate the power on a smaller area.

Some embodiments provide a networked system with a master device that can power-up or charge a plurality of slave devices and communicate with them. In some embodiments the master is connected to other network devices and/or Intranet/Internet though packet-based or non packet based networks and wired or wireless networks (such as Bluetooth®, Wireless Local Area Network (WLAN), fourth generation (4G) cellular, Code Division Multiple Access (CDMA), Time Division Multiple Access (TDMA), Worldwide Interoperability for Microwave Access (WiMAX), UWB and 60 GHz). The master in some embodiments monitors the power status of a plurality of slaves, decides which subset of those slaves get charged and what their charging priorities are. The slaves in some embodiments have different power status and capabilities (some have power to communicate, while others have low battery, and yet others have no battery).

In some embodiments, the slave has sensors (e.g. temperature, gyrator, pressure, and heart monitor) with electronic circuitry that are powered up by the master, perform their sensing functions and communicate their data to the master, a network server, or some other device. The channel for power transfer in some embodiments is RF or electromagnetic induction. A control channel is used in some embodiments by the master to send commands to the slaves. Some embodiments use the same channel for power, control, and communication. One, two or all of the power, control, and communication in some embodiments use different channels (e.g. different frequencies, different radios, different antenna, and different coils for induction) or different methods (RF Beam and induction).

In some embodiments, the master configures the system to increase power and communication efficiency (e.g. uses several antenna and beam steering for RF, or several coils and coil pattern optimization for induction). In some embodiments the master and the slave have a matrix of coils (for induction) and the master changes it's transmit coil pattern in order to optimize power transfer to the slave. Several masters in some embodiments cooperate or are configured by a network server or remote user to use beam steering and different antennas to charge a plurality of slaves. In some embodiments the slaves provide their identifying information and register themselves in a slave information database. In some embodiments the masters provide their identifying information and register themselves in a master information database. The master in some embodiments receives a slave's identifying information (MAC ID, network Internet protocol (IP) address, name, serial number, product name and manufacturer, capabilities, etc.) by communicating with the slave or by examining the slave information database to select which slaves to power up, charge, or communicate with. A slave in some embodiments prevents non-authorized masters (or networked servers) from trying to charge it or power it up by checking the master's identifying information with the authorized master's list stored on the slave. The master's selection and power scheduling of slaves is dependent on the priorities of slaves' functions and data in some embodiments.

In some embodiments, the master uses frequency hopping and time hopping to select some slaves from a plurality of slaves. A master in some embodiments charges a slave to a pre-set high level, then communicates with it until battery falls to a pre-set low level, and then charges slave again, etc. A master in some embodiments powers-up/charges a slave's battery and communicate with the slave at the same time. In some embodiments a slave that is powered up gets connected to a network (packet-based or non packet based, wired or wireless such as Bluetooth®, WLAN, 4G cellular, CDMA, TDMA, WiMax, UWB and 60 GHz) through the master, through other nearby slaves, or directly to an access point/tower.

A master that does not have a network connection in some embodiments charges a slave and uses the slave's network connection to connect to the network and perform networked operations such as downloading software and driver upgrades. In some embodiments a slave that is powered up and charged becomes a master charger for other slaves.

The master and the slave optionally have a touch screen and/or keyboard for entering data which can be displayed on the screen and/or communicated, respectively, to the slave and the master in some embodiments. A network server that is connected to the master is effectively the real master in some embodiments and instructs the master, monitors the power status of a plurality of slaves, decides which subset of those slaves are powered up/charged/communicate with, and what their priorities are. Also, an authorized remote user in some embodiments uses the network to connect to the network server and control the network server, which in turn instructs the masters to monitor the power status of a plurality of slaves, decide which subset of those slaves are powered up/charged/communicate with, and what their priorities are.

A non-conductive spacer is used in some embodiments to create a separation distance of several wavelengths for RF charging and communication. Networked master chargers (both RF and induction) are in some embodiments built-in to conference room tables, office tables or lightweight pads so that meeting participants are able to wirelessly charge their devices, connect to each other or to the Intranet/Internet, transmit/receive information, and make payment transactions. Multi-coil induction masters, tables or pads in some embodiments have a credit card reader. Similarly, RF masters in some embodiments include credit card readers, so users can "sweep" their card for magnetic cards or they can read NFC-enabled cards with NFC. Therefore, users of slaves are not only able to charge their devices but also make payment transactions. For instance, phones with near field communication (NFC) capabilities in some embodiments are charged and are also used for contactless payment so that the user places the phone near those coils (or RF beams of a master in the case of RF-based master) in order to transmit payment information to a secured server on the Internet. Alternatively, credit cards in some embodiments have a chip so that they transmit their information to the master device.

Some of the coils of a multi-coil master (or RF beams of a master in the case of a multi-antenna RF-based master) in some embodiments are dedicated and optimized for communication, while others are optimized for charging. The master has different means for power, e.g., one or more of AC and adaptor, battery, induction, etc.

In some embodiments, a master uses an external induction charger to get charged, and then uses a high frequency directional and focused RF beam to power up a slave device and communicate with it. A master uses induction in some embodiments to charge a slave and uses a communication transceiver (e.g. a high frequency directional and focused RF beam) to communicate with the slave. Two or more slaves are charged by a master induction charger in some embodiments and then communicate with each other directly or through the master, possibly under the control of a remote network server.

In some embodiments an element is designed for the master, slave or both so that at low frequencies the element is like a coil inductor and at high frequencies the element is like an antenna. This means that at the same time both RF power and induction power are available. If the distance is short then waves cannot be created and it will be more like induction. So distance is used to select one mode or the mode is chosen automatically. In other embodiments, the master, slave or both to have two different elements for different distances (one for short distances and one for far distances). In some of these embodiments, the master does time multiplexing between the two or select one over the other. In some embodiments, an element is designed to be a coil at low frequencies and a multiple antenna at high frequencies with beam forming capabilities. The length of the coil is much bigger than the size of antenna required for RF at high frequencies. In some embodiments, this coil is divided into multiple RF antennas and the resulting multiple antennas is used to do beam forming.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
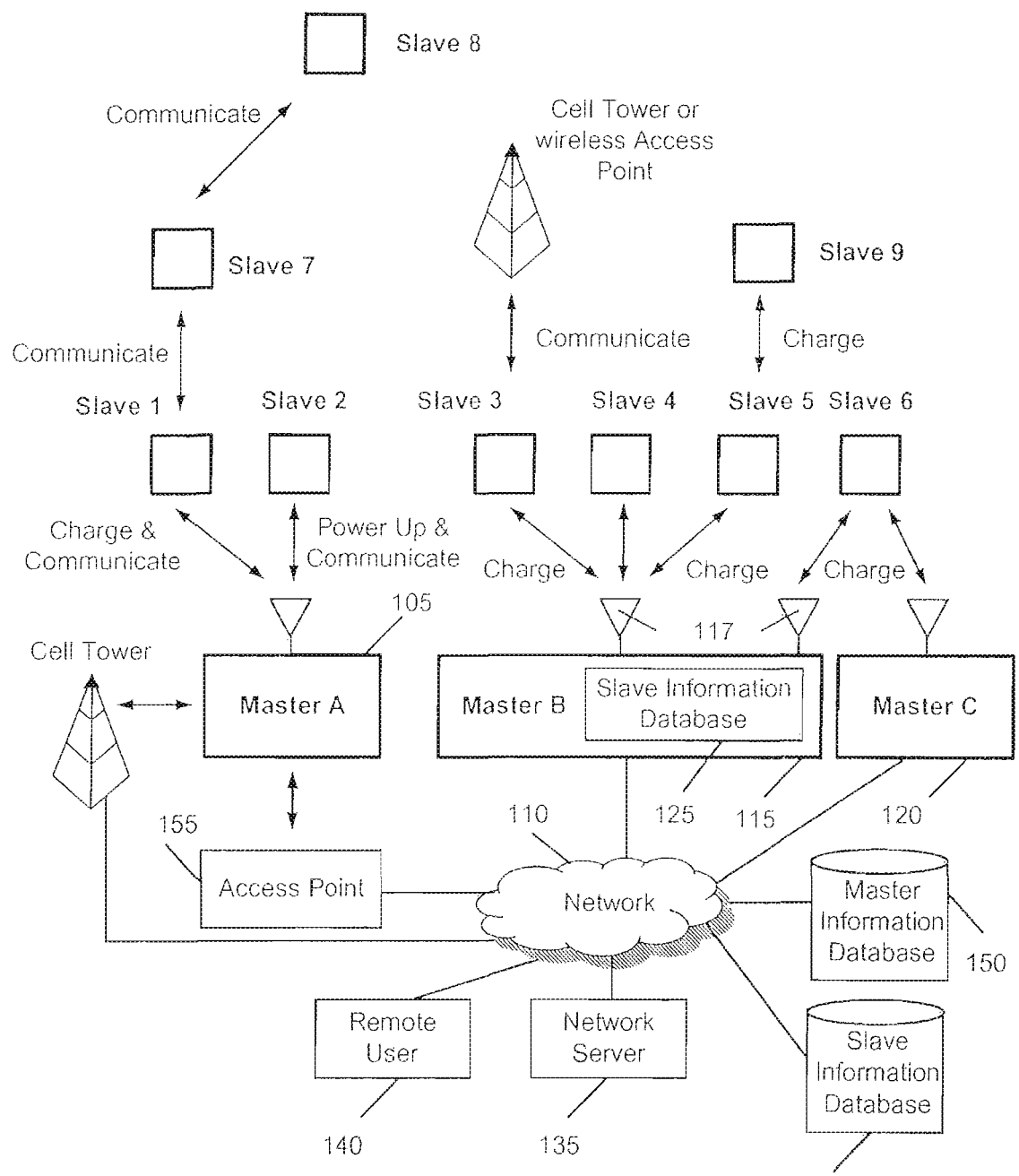
FIG. 1 conceptually illustrates an overview of the networked aspect of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a wireless transmitter that uses radio frequencies (RF) with small high gain directive antennas and high frequency radio waves or electromagnetic induction to charge one or more receiving devices and then communicate with them. Wireless communication is convenient because it allows devices to connect to each other without wires. Wireless power is convenient because it removes the need for wires and connectors. This invention combines these two aspects together.

Some embodiments use radio frequency (RF) instead of resonant electromagnetic induction to charge and communicate with slave devices. Throughout this specification the 60 GHz spectrum is used for describing the RF charging aspect of this invention. However, 60 GHz is only one special case of using higher frequencies for implementing this invention. In the U.S. the 60 GHz spectrum band can be used for unlicensed short range data links (1.7 km) with data throughputs up to 2.5 Gbits/s. Higher frequencies such as the 60 GHz spectrum experience strong free space attenuation. The smaller wavelength of such high frequencies also enables the use of small high gain antennas with small beam widths. The combination of high attenuation and high directive antenna beams provides better frequency reuse so that the spectrum can be used more efficiently for point-to-multipoint communications. For example, a larger number of directive antennas and users can be present in a given area without interfering with one another, compared to less directive antennas at lower frequencies. Small beam width directive antennas also confine the electromagnetic waves to a smaller space and therefore limit human exposure. The higher frequencies also provide more bandwidth and allow more information to be wirelessly transmitted. Thus, the same antenna can be used to for power generation and communication.

There are several standards bodies that are using high frequencies such as 60 GHz. These include WirelessHD, WiGig, and WiFi IEEE 802.11ad. The WirelessHD specification is based on the 7 GHz of continuous bandwidth around the 60 GHz radio frequency and allows for digital transmission of uncompressed high definition (HD) video, audio and data. It is aimed at consumer electronics applications and provides a digital wireless interface for file transfers, wireless display and docking, and lossless HD media streaming for ranges up to 10 meters. Theoretically it can support data rates as high as 25 Gbit/s. The 60 GHz band usually requires line of sight between transmitter and receiver because of high absorption. The WirelessHD specification gets around this limitation by using beam forming at the transmitter and receiver antennas to increase effective power of the signal.

The WiGig standard (short for the "Wireless Gigabit Alliance") is also promoting high speed wireless communication over the unlicensed 60 GHz spectrum and is a competing standard to WirelessHD. The WiGig standard is also taking advantage of the high absorption of 60 GHz that limits signal propagation and reduces interference with other wireless systems.

IEEE 802.11ad is also under development by the IEEE task group for the upcoming 600 Hz standard. This is essentially a faster version of the IEEE 802.11 standard that uses the 60 GHz band. However, because it uses a new spectrum it will not be backward compatible with existing WiFi.

Wireless USB is a standard which does not use 60 GHz. Wireless USB uses the Ultra-wideBand (UWB) radio platform that operates in the 3.1 to 10.6 GHz frequency and can transmit 480 Mbit/s at distances up to 3 meters and 110 Mbit/s at up to 10 meters. While the goal of 802.11 family (802.11*) WiFi is to replace Ethernet cables and provide wireless Internet access, the goal of Wireless USB is to remove the cables from USB based PC peripherals. Wireless USB can be used for printers, scanners, digital cameras, MP3 players, game controllers, hard disks, and flash drives. Both WirelessHD and WiGig are competing in some aspects with the Wireless USB standard. Inductive Charging in some embodiments is performed at lower frequencies such as frequencies of less than 100 MHz, whereas RF frequencies used in some embodiments is greater than 900 MHz or 1 GHz. The higher the RF frequencies, the smaller the wavelength and hence the smaller the size of the antenna.

None of the above standards address charging slave devices before communicating with them. Instead they assume that the slaves have access to some power source such as AC power or a battery. In some embodiments a master device uses one or more directional antennas or uses antenna array beam forming to transmit high frequency RF signals to one or more slave devices to power them up or charge their batteries. By using the directional antennas or using antenna array beam forming, these embodiments concentrate the power on a smaller area.

Some embodiments provide a networked system with a master device that can power-up or charge a plurality of slave devices and communicate with them. In some embodiments the master is connected to other network devices and/or Intranet/Internet though packet-based or non packet based networks and wired or wireless networks (such as Bluetooth®, Wireless Local Area Network (WLAN), fourth generation (4G) cellular, Code Division Multiple Access (CDMA), Time Division Multiple Access (TDMA), Worldwide Interoperability for Microwave Access (WiMAX), UWB and 60 GHz). The master in some embodiments monitors the power status of a plurality of slaves, decides which subset of those slaves get charged and what their charging priorities are. The slaves in some embodiments have different power status and capabilities (some have power to communicate, while others have low battery, and yet others have no battery).

In some embodiments, the slave has sensors (e.g. temperature, gyrator, pressure, and heart monitor) with electronic circuitry that are powered up by the master, perform their sensing functions and communicate their data to the master, a network server, or some other device. The channel for power transfer in some embodiments is RF or electromagnetic induction. A control channel is used in some embodiments by the master to send commands to the slaves, Some embodiments use the same channel for power, control, and communication. One, two or all of the power, control, and communication in some embodiments use different channels (e.g. different frequencies, different radios, different antenna, and different coils for induction) or different methods (RF Beam and induction).

In some embodiments, the master configures the system to increase power and communication efficiency (e.g. uses several antenna and beam steering for RF, or several coils and coil pattern optimization for induction). In some embodiments the master and the slave have a matrix of coils (for induction) and the master changes it's transmit coil pattern in order to optimize power transfer to the slave. Several masters in some embodiments cooperate or are configured by a network server or remote user to use beam steering and different antennas to charge a plurality of slaves. In some embodiments the slaves provide their identifying information and register themselves in a slave information database. In some embodiments the masters provide their identifying information and register themselves in a master information database. The master in some embodiments receives a slave's identifying information (MAC ID, network Internet protocol (IP) address, name, serial number, product name and manufacturer, capabilities, etc.) by communicating with the slave or by examining the slave information database to select which slaves to power up, charge, or communicate with. A slave in some embodiments prevents non-authorized masters (or networked servers) from trying to charge it or power it up by checking the master's identifying information with the authorized master's list stored on the slave. The master's selection and power scheduling of slaves is dependent on the priorities of slaves' functions and data in some embodiments.

In some embodiments, the master uses frequency hopping and time hopping to select some slaves from a plurality of slaves. A master in some embodiments charges a slave to a pre-set high level, then communicates with it until battery falls to a pre-set low level, and then charges slave again, etc. A master in some embodiments powers-up/charges a slave's battery and communicate with the slave at the same time. In some embodiments a slave that is powered up gets connected to a network (packet-based or non packet based, wired or wireless such as Bluetooth®, WLAN, 4G cellular, CDMA, TDMA, WiMax, UWB and 60 GHz) through the master, through other nearby slaves, or directly to an access point/tower.

A master that does not have a network connection in some embodiments charges a slave and uses the slave's network connection to connect to the network and perform networked operations such as downloading software and driver upgrades. In some embodiments a slave that is powered up and charged becomes a master charger for other slaves.

The master and the slave optionally have a touch screen and/or keyboard for entering data which can be displayed on the screen and/or communicated, respectively, to the slave and the master in some embodiments. A network server that is connected to the master is effectively the real master in some embodiments and instructs the master, monitors the power status of a plurality of slaves, decides which subset of those slaves are powered up/charged/communicate with, and what their priorities are. Also, an authorized remote user in some embodiments uses the network to connect to the network server and control the network server, which in turn instructs the masters to monitor the power status of a plurality of slaves, decide which subset of those slaves are powered up/charged/communicate with, and what their priorities are.

A non-conductive spacer is used in some embodiments to create a separation distance of several wavelengths for RF charging and communication. Networked master chargers (both RE and induction) are in some embodiments built-in to conference room tables, office tables or lightweight pads so that meeting participants are able to wirelessly charge their devices, connect to each other or to the Intranet/Internet, transmit/receive information, and make payment transactions. Multi-coil induction masters, tables or pads in some embodiments have a credit card reader. Similarly, RF masters in some embodiments include credit card readers, so users can "sweep" their card for magnetic cards or they can read NFC-enabled cards with NFC. Therefore, users of slaves are not only able to charge their devices but also make payment transactions. For instance, phones with near field communication (NEC) capabilities in some embodiments are charged and are also used for contactless payment so that the user places the phone near those coils (or RF beams of a master in the case of RF-based master) in order to transmit payment information to a secured server on the Internet. Alternatively, credit cards in some embodiments have a chip so that they transmit their information to the master device.

Some of the coils of a multi-coil master (or RF beams of a master in the case of a multi-antenna RF-based master) in some embodiments are dedicated and optimized for communication, while others are optimized for charging. The master has different means for power, e.g., one or more of AC and adaptor, battery, induction, etc.

In some embodiments, a master uses an external induction charger to get charged, and then uses a high frequency directional and focused RF beam to power up a slave device and communicate with it. A master uses induction in some embodiments to charge a slave and uses a communication transceiver (e.g. a high frequency directional and focused RF beam) to communicate with the slave. Two or more slaves are charged by a master induction charger in some embodiments and then communicate with each other directly or through the master, possibly under the control of a remote network server.

In some embodiments an element is designed for the master, slave or both so that at low frequencies the element is like a coil inductor and at high frequencies the element is like an antenna. This means that at the same time both RF power and induction power are available. If the distance is short then waves cannot be created and it will be more like induction. So distance is used to select one mode or the mode is chosen automatically. In other embodiments, the master, slave or both to have two different elements for different distances (one for short distances and one for far distances). In some of these embodiments, the master does time multiplexing between the two or select one over the other. In some embodiments, an element is designed to be a coil at low frequencies and a multiple antenna at high frequencies with beam forming capabilities. The length of the coil is much bigger than the size of antenna required for RF at high frequencies. In some embodiments, this coil is divided into multiple RF antennas and the resulting multiple antennas is used to do beam forming.

Some embodiments provide a system for charging devices. The system includes a master device and a slave device. Some embodiments provide a method for charging devices in a system that includes a slave device and a master device. The slave device includes (1) an antenna to receive a radio frequency (RF) beam and (2) a power generation module connected to the antenna that converts RF energy received by the slave antenna to power. The master device includes (1) a directional antenna to direct RF power to the antenna of the slave device and (2) a module that provides power to the directional antenna of the master device.

Some embodiments provide a system for charging devices. The system includes a master device and a slave device. Some embodiments provide a method for charging devices in a system that includes a slave device and a master device. The master device includes a first group of coils to transmit energy by induction. The first group of coils is arranged in a first pattern. The master device also includes a module that provides alternating power to the first group of coils. The master device also includes a processing module. The slave device includes a second group of coils to receive energy by induction from one or more coils of the master device. The second plurality of coils is arranged in a second pattern. The slave also includes a power generation module connected to the second group of coils that converts the received induction energy to power. The master processing unit (i) receives information from the slave regarding the slave coil pattern and (ii) based on the received information, activates a set of coils in the first group of coils to optimize an amount of induction energy received by the second group of coils.

In some embodiments, the processing module (i) receives information regarding the amount of induction energy received by the second group of coils and (ii) when the induction energy received by the second group of coils does not satisfy a threshold, activates a different set of coils in the first group of coils to further optimize an amount of induction energy received by the second group of coils.

Some embodiments provide a system for charging devices. The system includes a master device and a slave device. Some embodiments provide a method for charging devices in a system that includes a slave device and a master device. The master device includes a first group of coils to transmit energy by induction. The master device also includes a module that provides alternating power to the first group of coils. The slave device includes a second group of coils to receive energy by induction from one or more coils of the master device. The second group of coils has a set of operating parameters. The slave also includes a power generation module connected to the second group of coils that converts the received induction energy to power. The slave also includes a processing module. The slave processing unit (i) receives a set of master device's parameters and (ii) based on the received master device's parameters, reconfigures one or more of the operating parameters of the second group of coils to maximize the received induction power.

In some embodiments, the master device's parameters include an operating frequency of the master's induction frequency, data and modulation method used by the master, and an identifying information of the master. In some embodiments, the operating parameters of the slave device are reconfigured by tuning of one or more coils in the second plurality of coils. In some embodiments, the operating parameters of the slave device are reconfigured by calibrating of one or more coils in the second group of coils. In some embodiments the operating parameters of the slave device are reconfigured by impedance matching of one or more coils in the second group of coils.

Several more detailed embodiments of the invention are described in sections below. Section I provides an overview of several embodiments of the invention. Section II describes different embodiments of the invention that provide charging remote device using RF beams. Next, Section III describes several embodiments that charge remoter devices using induction. Section IV discusses hybrid embodiments that charge remote devices using both RF beams and induction. Finally, section V provides a description of a computer system with which some embodiments of the invention are implemented.

I. Overview

A. Charging and Communicating with One or More Slaves

FIG. 1 conceptually illustrates an overview of the networked aspect of some embodiments of the invention. Masters in some embodiments charge and communicate with one or more of the slave devices within their vicinity. The master in some embodiments is connected to other network devices. In the example of FIG. 1, master A 105 is connected using a wireless channel (packet-based system or non-packet based system, Bluetooth®, WLAN, 4G cellular, CDMA, TDMA, WiMax, UWB and 60 GHz, etc.) through an access point 155 to a network 110 and powers up slaves 1 and 2. Master B 115 has multiple antennas 117, is connected to a network 110 using a wireline, and powers up slaves 3, 4 and 5. Master C 120 is also connected to a network 110 using a wireline. Master B 115 and master C 120 cooperate (or are controlled by a controller device such as network server 135 or remote user 140) and use beam steering to charge slave 6. The slaves differ in their power status and capability in some embodiments. Some slaves have power and communicate, while others have low battery, and yet others have no battery. The charging of the slaves is done wirelessly with methods such as a resonant electromagnetic induction channel or an RF channel.

B. Power Transfer to Authorized Slaves

Charging in some embodiments is initiated by the slave or by the master when the two are close to each other (for example either automatically or by pressing a button on the slave or the master, respectively). A master selects which slaves to power up and communicate with in some embodiments. The slaves have identifying information about themselves stored in their memories. This stored information includes one or more of the slaves' media access control address (MAC address or MAC ID), network IP address, name, serial number, product name and manufacturer, capabilities, etc. The master (or a controller device such as a network server, or a remote user) requests that information. In some embodiments, the slaves are proactive and communicate with the master (or a controller device such as a network server, or a remote user) if they have power (e.g. charge my battery, I want to send you some data, etc.) and provide their identifying information and register themselves in a slave information database. In some embodiments, the master has access to a stave information database that includes an authorized list. This database is locally stored 125 on the master 115 or it is stored on a possibly larger networked database 130.

In some embodiments, a master that employs a focused directional RF beam uses beam steering to focus the beam on a particular slave, power the slave up slightly to get slave's identifying information, and only continue powering up/charging and communication if the slave's identifying information match with an entry on the authorized list. For instance, only a slave with a certain MAC ID, network IP address, name, serial number, product name, manufacturer, capabilities, etc. may be powered up, charged or communicated with. For RF-based methods frequency hopping methods are also used in some embodiments by the master and authorized slaves to allow them to get power while unauthorized nearby slaves (that do not know the hopping sequence) do not receive much power. Similarly, a master that employs focused RF beams uses time hopping to power up slaves.

A master that uses resonant induction uses the right resonant frequency that matches the slave, coil matrix frequency hopping, coil matrix time hopping, and current/voltage to power up a nearby authorized slave in some embodiments. The slave's identifying information is communicated by the slave to the master in some embodiments if the slave has some power (communicated using RF communication, backscattering, infrared or other methods), or communicated after an initial sub-optimal power-up. Again, the master only transfers power to the slave if the slave's identifying information match with an entry on an authorized list. In some embodiments, the slave's resonant frequency is stored at the master (e.g., in slave information database 125) or at a network database (e.g., in slave information database 130).

C. Power Transfer only from Authorized Masters

A slave prevents non-authorized masters from trying to charge it or power it up (or networked servers from commanding masters to charge it or power it up) in some embodiments. Slaves store identifying information about masters (or networked servers) that are authorized to charge them. The stored information about authorized masters or networked servers includes one or more of the following information about the masters: the masters' media access control address (MAC ID), network IP address, name, serial number, product name and manufacturer, capabilities, etc. The slave requests identifying information from the master or the network server. The master (or the network server) in some embodiments is also proactive and sends its identifying information to the slave. The masters in some embodiments also register themselves and their identifying information in a master information database 150. The slave in some embodiments checks the master's information with the authorized list and if there is not a match the slave disables charging and/or power-up.

D. Master's Scheduling of Slaves

The selection and power scheduling of slaves in some embodiments are dependent on the priorities of slaves' functions or data (e.g. slave 1 with a higher priority gets 5 minutes scheduled for charging and slave 2 with a tower priority gets 3 minutes). A slave information database 125 stored at the master 115 or a slave information database 130 stored on the network include priorities for slaves and their data in some embodiments. The slaves also communicate their data (and possibly the priority of their data) to the master in some embodiments. Based on this information the master then decides on a course of action.

E. Charging and Communication Strategies

The power status of slaves and their power-related requests and the master's response strategy vary significantly in different embodiments. The followings are several examples: (1) slave has battery and power and is ready to communicate. Master may communicate; (2) slave has battery and some charge, and slave requests to communicate. Master may allow communication or overrule and charge the slave further first (e.g. if after communicating the quality of slave data is not high because of the low power status of slave); (3) slave has battery and some charge, but slave requests to be fully charged. Master may honor the request and charge the slave or may overrule and communicate with the slave (e.g. if live communication has higher priority); (4) slave has battery but battery has no charge. Master may charge the battery first or just power up the stave and communicate first if communication priority is high; (5) for options 1, 2, 3, and 4 above if after communicating a slave's battery charge level reaches zero or some pre-determined tow level then the battery is charged to some higher pre-determined level before resuming communication; (6) for options 1, 2, 3, and 4 above if there is sufficient power transferred from the master to the slave then the shave may communicate at the same time that the master is charging the battery; (7) slave has battery and after it is charged by the master to a sufficient level the slave connects and communicates with nodes in another network (e.g. slaves 1 and 3 connect to Bluetooth®, WLAN, 4G cellular, WiMax, UWB, 60 GHz and mesh ad-hoc networks). The master optionally continues to charge the slave or charge the slave once the slave's battery levels reach pre-set low levels; (8) slave has no battery and needs to be powered up before communication. Master powers up the slave before communicating (e.g. slave 2 in FIG. 1).

F. Charging Channel, Communication Channel and Control Channel

In some embodiments the same channel is used for both charging the slave and communication, while in other embodiments different channels are used for charging and communication (e.g. two RF channels possibly with different frequencies—one for charging and one for communication, or charging with resonant induction and communication with RF). In some embodiments, the master also uses a control channel to inform the slaves what it wants to do. Thus, all the commands could come over the control channel, although it is also possible to send commands over the data communication channel as well. The control channel does not need to have high bandwidth. Thus, while the communication channel and the control channel use the same frequency in some embodiments, the control channel uses a lower frequency lower bandwidth channel than the communication channel. The master may also use an induction charger or RF charger to charge its own battery if its power source is a rechargeable battery instead of AC power.

G. Connecting to New Networks for Slaves and/or Master

When the master is connected to a network (packet-based or non packet-based, Bluetooth®, WLAN, 4G cellular, TDMA, CDMA, WiMax, UWB, 60 GHz, etc., or wired connection) then a powered up or charged slave is also connected to the same network through the master (e.g. slave 4 in FIG. 1). Likewise, when a slave is connected to a network (Bluetooth®, WLAN, 4G cellular, WiMax, UWB, 60 GHz, etc., or wired connection) then the master gets connected to that network after the master charges that slave (e.g. slave 3 and Master B 115 in FIG. 1). Thus, after powering up slave 3 not only is slave 3 able to connect to its wireless network (Bluetooth®, WLAN, 4G cellular, WiMax, UWB, 60 GHz, etc.) but master B 115 is also able to connect to those networks through slave 3 acting as a network node. If a master does not have a network connection and a slave does the master in some embodiments charges the slave and use its network connection to connect to the network and perform networked operations such as downloading software and driver upgrades.

H. Slave Mesh Networks

A slave that gets powered up acts as a network node and communicate with other slaves in some embodiments. For instance, in FIG. 1 slave 1 is initially powered up by master A 105. Master A 105 cannot communicate with slave 7 because slave 7 is not within its communication range. However, master A 105 can communicate with slave 1, and slave 1 can in turn communicate with slave 7. Likewise, slave 7 can communicate with slave 8, etc. Thus, by charging slave 1 the master has connected itself to a mesh network of slaves and other networks that it was not connected to before.

I. Slave Becoming Chargers

Slaves that get charged act as masters and charge other slaves in some embodiments. In FIG. 1 slave 5 is charged by master B 115. Slave 9 also needs to be charged. In this example, slave 5 charges slave 9. This may for example be because slave 9 is too far from master B for charging.

J. Network Server or Remote User Controls the Master

The explanations above assume that masters A and B control the decision making in FIG. 1. It is also possible that a network server is in command and is the "real" master. For example, the network server 135 instructs master B 115 to power up the slaves in its vicinity and requests information from the slaves. Master B 115 then sends the slaves' identifying information and any matching entries it has in its own database 125 (together with any slave requests) to the network server 135, the network server further searches the networked slave information database 130 for additional identifying and matching information, and then instructs the master on a course of action (e.g. charge slaves 1 and 3, but no further action with unauthorized slave 4). In some embodiments, an authorized remote user 140 uses the network 110 to connect to the network server 135 and control the network server, which in turn controls the masters as just described. Thus, depending on which component is in control (remote user, network server, or a master) that component monitors the power status of a plurality of slaves, decides which subset of those slaves get charged and what their charging priorities are.

II. Charging with RF

In some embodiments, the master uses a narrow focused RF beam for charging. Converting RF signals to DC power has been done in Radio-Frequency Identification (RFID) far field applications. In near field RFID applications, where the distance between the RFID reader and the tag is less than the wavelength of the signal, mutual inductance is used for communication. However, in far fields RFID applications, where the separation distance between the RFID reader and the tag is much greater than the wavelength of the signal, backscattering is used for communication. With backscattering a tag first modulates the received signal and then reflects it back to the reader. There are several important differences between the disclosed embodiments of the current invention and those of far field RFID which are described through this specification. For instance, RFID does not use directional beams and hence spreads the power of the transmission over a wider space and unnecessarily exposes humans to electromagnetic radiation. RFID tags also require little power to operate (e.g. the receive power is of the order of 200 microwatts) compared to the slave devices that the disclosed embodiments of the current invention powers-up and communicates with. For instance, the receive power for the slaves in some embodiments of the invention is of the order of milliwatts and higher. The upper receive power range depends on the transmit drivers and the size of the coils or antennas, and in some embodiments goes above the Watt range. RFID operates in lower frequencies (e.g. less than 960 MHz) and hence provides smaller communication bandwidths and requires much bigger antennas compared to the higher frequencies used in different embodiments of the current invention. Also, RFID uses backscattering for communication which is a low data rate method because the antenna is turned on and off by the data like an on-off modulation switch. The embodiments of the current invention provide a much higher data rate because standard wireless transceiver modulation methods are used (e.g. modulations for cellular, 802.11*, Bluetooth®) and then the data is sent to the antenna.

In contrast to RFID, some embodiments of the current invention use narrow directional focused beams in order to simulate a wire connection for charging and communication. This focusing of the beam provides more power and energy for charging slave devices. A directional antenna is an antenna which radiates the power in a narrow beam along a certain angle and directed to a certain area or receive antenna. Some embodiments of the invention use directional antennas that provide a large gain in theft favored direction. Some embodiments use a group of antennae (an antenna array) arranged to provide a large gain in a favored direction.

Figure 2:
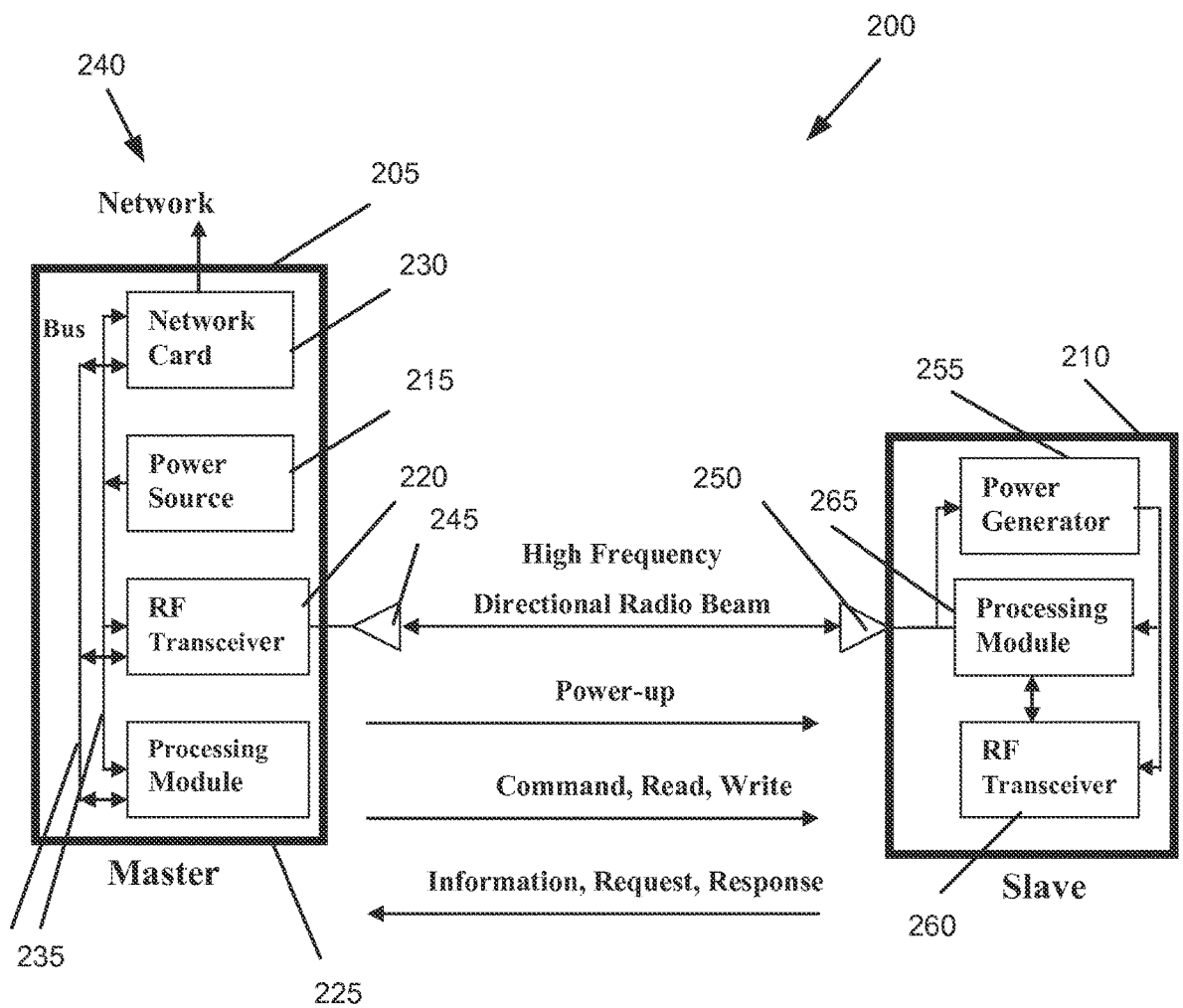
FIG. 2 conceptually illustrates an overview of the system of some embodiments of the invention where the slave does not have a battery.

FIG. 2 conceptually illustrates an overview of a system 200 of some embodiments of the invention where the slave does not have a battery. The master 205 is the bigger system component with a good power source 215 (e.g. AC or a good battery life), whereas the slaves 210 (only one is shown for simplicity) have limited sources of power (e.g. limited battery or no battery). Example master devices are a car, PC, laptop, cell phone, digital/video camera, or multimedia device such as an IPod. The slave device could be any non-battery device (e.g. memory stick or memory device) or DC or battery operated device. Some examples of the latter are laptop, cell phone, PDA, wireless headsets, wireless mouse, wireless keyboard, pager, digital/video camera, external hard drive, toy, electronic book readers, sensor, CD/DVD/cassette/MP-3 player, toothbrush, lighting devices, electronic appliances, or a car (e.g., an electric car). Even AC powered devices in some embodiments use this system as a backup power system in case AC power goes off. Thus, a battery operated master could power up an AC powered device that temporarily has lost its AC power source.

In some embodiments, the master is just a dedicated charging device and does not communicate with the slaves other than for charging. The master has a power source 215 such as AC or battery. The power source powers the master's RF transceiver 220, processing module 225 and network card 230 which are all connected to a bus 235. Although the term transceiver (which implies a module with shared circuitry for a transmitter and receiver) is used in FIG. 2 and some of the following figures, the invention is not restricted to transceivers. Some embodiments use transmitter-receiver modules (which has transmitter and receiver in the same housing without common circuitry) while other embodiments use separate transmitter and receiver modules. The master may be connected to a network 240 such as the Internet through its network card 230 or through a wireless connection. The master has a high gain antenna 245. The master's RF transceiver 220 uses the antenna 245 to shoot its focused beam to the slave to power up the slave. This power up RF wave is not modulated since it is used for power generation and not data transmission. The antenna in some embodiments is comprised of sub-elements such that through different phases and amplitudes the master uses beam steering to change the angle of the beam as described by reference to FIGS. 4 and 8 below. The battery-less slave 210 of FIG. 2 also has a directional antenna 250 that is connected to a power generator component 255. The power generator provides power from the received radio frequency signals. The energy from the master's RF transmission is converted by this component to a supply voltage (not shown) and is stored in a capacitor (not shown). This supply voltage is then provided to the slave's transceiver 260 and processing module 265 to power them up. The slave may optionally have a network card (not shown) which is also powered up with this supply voltage. The slave uses the network card or its RF transceiver to connect to a network. Once the slave is powered up it is ready to communicate with the master. The master then sends commands (e.g. read from slave's memory, write to slave's memory) to the slave in some embodiments. The slave sends receive acknowledgments to the master and responds to commands. For example, in response to a read command the slave returns data (text, images, audio, and video). The slave also sends status information to the master such as "I am this device", "I have data", "I need to be charged", "My battery level is 50%", etc in some embodiments. The range of this system is not limited by the radio since the radio requires lower sensitivity and can handle low input signals. The terms RF-based based master or RF beam master are interchangeably used in this specification to refer to a master that uses an RF beam to charge the slaves.

Figure 3:
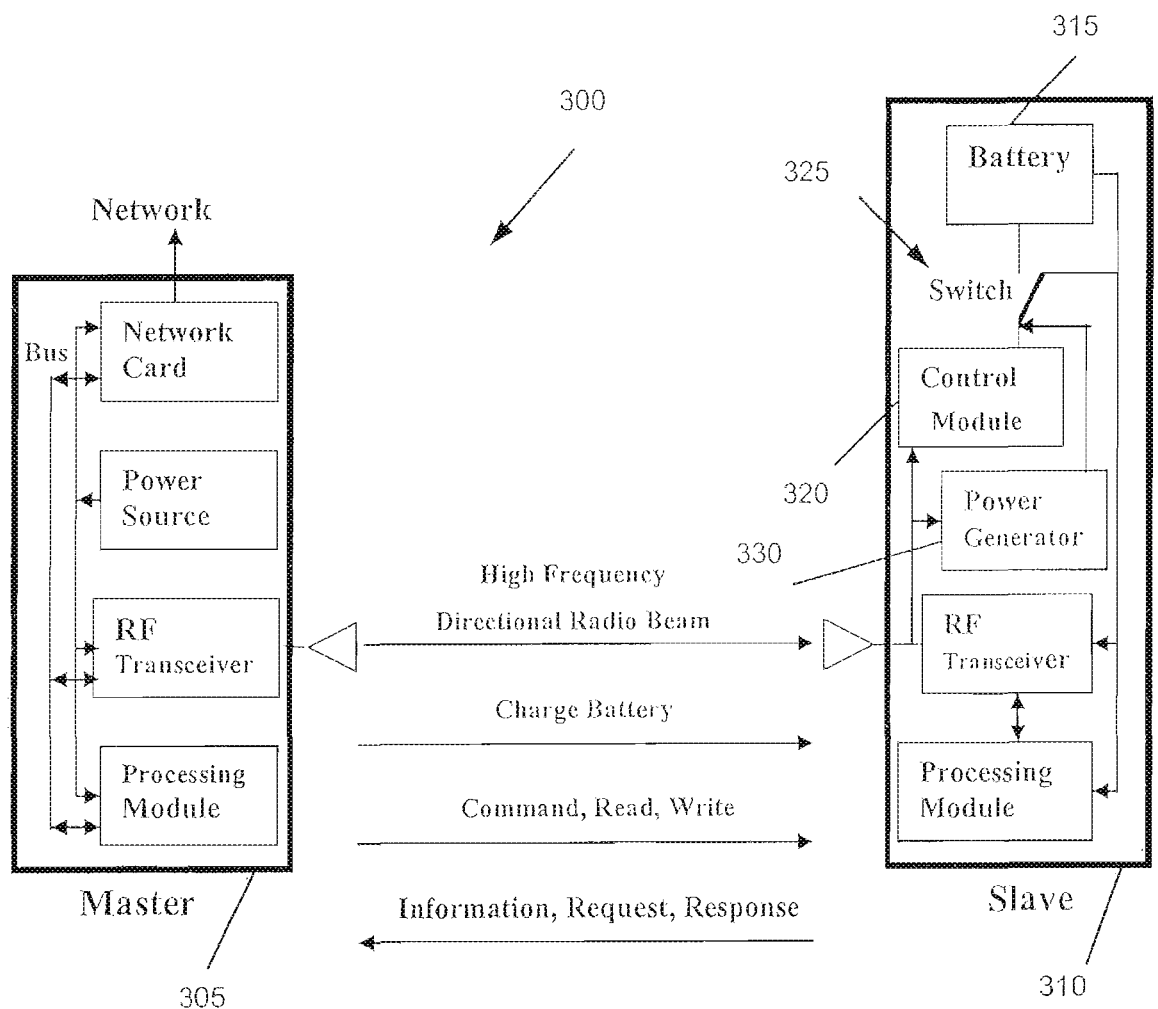
FIG. 3 conceptually illustrates an alternative system of some embodiments of the invention where the slave has a battery.

The power generator in FIG. 2 is used to generate a voltage supply and store it in a capacitor. FIG. 3 conceptually illustrates an alternative system 300 of some embodiments of the invention where the slave has a battery. The master components are similar to the components shown in FIG. 2. In these embodiments, the slave battery 315 is charged by a high frequency directional RF beam from a master device 305. The battery is then used for powering the slave 310 for communication. In FIG. 3 slave 310 uses a low frequency low bandwidth control channel 320 to adjust the position of a switch 325. In FIG. 3 slave 310 includes a control module 320 that uses a low frequency low bandwidth control channel to adjust the position of a switch 325 and set whether to use the energy captured by the power generator 330 to power up the device, charge the battery 315, or both. The control channel 320 could use a simple modulation method such as amplitude modulation (AM), frequency modulation (FM), phase, and quadrature amplitude modulation (QAM), rather than complex wireless modulation techniques (e.g. Orthogonal frequency-division multiplexing (OFDM)). These simple modulation schemes require less complex hardware and processing and are optimal for low-speed data. Either the slave, or the master, or both in combination can decide whether the slave should communicate at first or not. For example, the slave looks at its battery, decides how much life it has, and then determines whether to charge, communicate, or do both in some embodiments. Feedback mechanisms could be used to dynamically improve the system. For instance, if the slave sends data to the master and the master determines that the data from the slave is bad quality then the master in some embodiments uses the control channel to tell the slave to not use any of the received energy for charging and instead use all of it for live communication only. There are several possible strategies for slave power status and master charging, eight of which were listed in the previous section titled "Charging and Communication Strategies".

Figure 4:
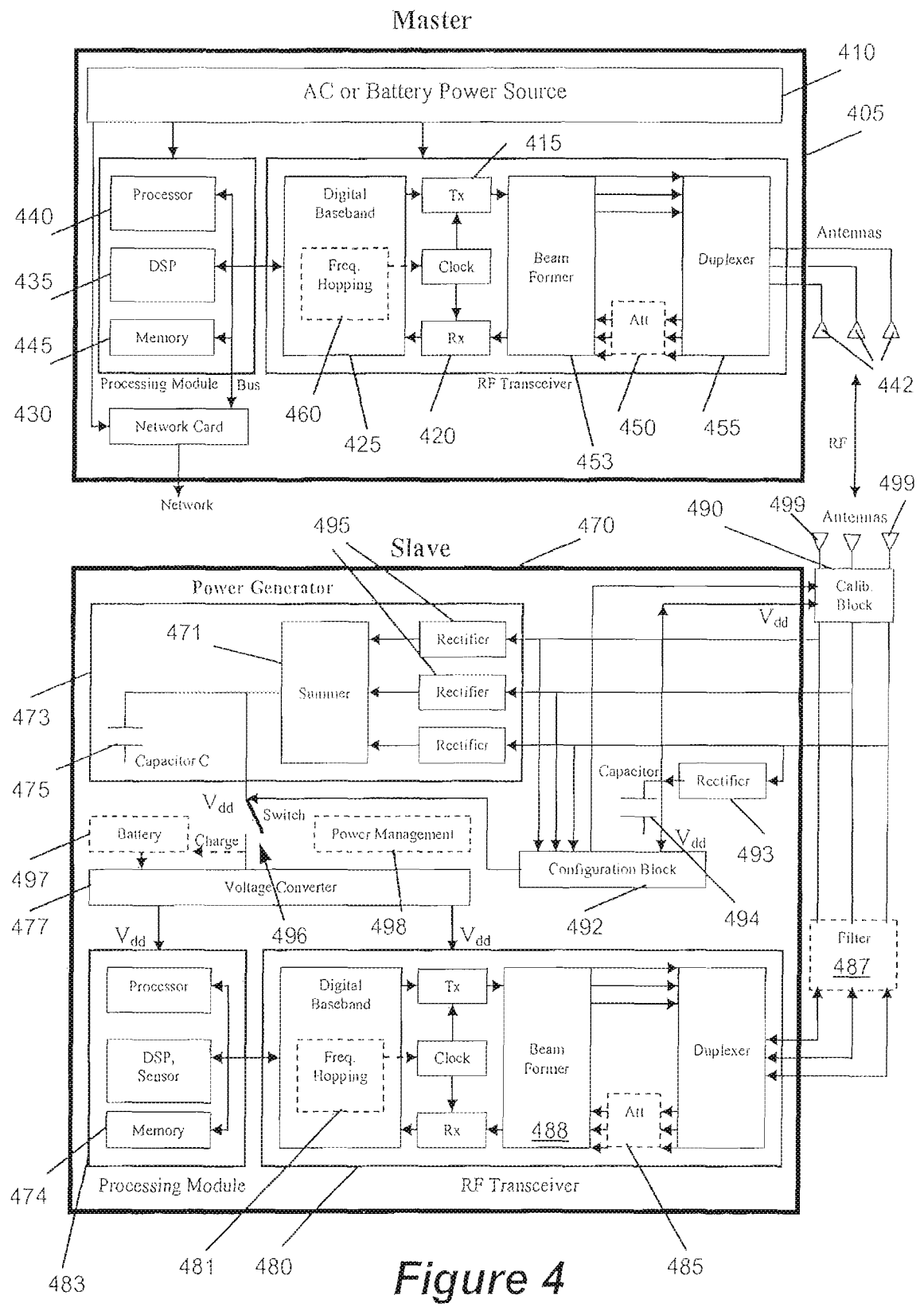
FIG. 4 illustrates a more detailed diagram of the embodiments shown in FIGS. 2 and 3.

FIG. 4 illustrates a more detailed diagram of the embodiments shown in FIGS. 2 and 3. The master 405 has a power source 410 such as AC power (which is rectified and regulated with an adaptor), battery, or some other power generating device (e.g. induction from another source as described below by reference to FIG. 20). The master's RF transceiver radio has a transmitter (Tx) 415, a receiver (Rx) 420, and a digital baseband processing unit 425. The transmitter includes a Digital to Analog Converter (DAC) (not shown). RF transmissions for power are not modulated, whereas data transmissions use modulation and optionally coding. The receiver includes an Analog to Digital Converter (ADC) (not shown). The digital baseband unit 425 communicates with a processing module 430 that includes a digital signal processing unit 435, a processor 440 and memory 445. The transceiver's transmitter and receiver use a duplexer 455 that allows bi-directional communication over a single channel and antenna. Some embodiments include an optional attenuator 450 which is placed in front of the receiver. This protects the receiver from being overloaded by the transmitter or by other large incoming signals. The attenuator also allows the receiver to receive when the transmitter transmits. The attenuator attenuates the entire signal and is like an all-pass filter. Alternatively, instead of the attenuator some embodiments include frequency-selective filter to protect the radio. FIG. 4 shows a general case where the antenna has sub-elements 442 that enable steeling of the beam. Each antenna sub-element is effectively a separate antenna and throughout this specification the term antenna and antenna sub-element will be used interchangeably. In FIG. 4 a beam-forming unit (or beam former) 453 is placed before the duplexer 455. In other embodiments the beam-forming unit is placed after the duplexer. The beam former takes the output of the transmitter (Tx) and generates different phase and amplitudes for each of the antenna sub-elements in order to steer the beam. Likewise, on the receive side the beam-former takes multiple receive signals from each antenna sub-element and combines them with multiple phases/amplitudes and provides the output to the receiver (Rx). In yet other embodiments there is not an explicit beam-forming component and the beam-forming function is integrated into the transmitter (Tx) and receiver (Rx) where they generate the phase and amplitudes for beam-forming. The master's beam former is used to focus the transmit power on the slave's antenna for optimum power transfer, while the slave's beam former is used mostly for communication.

In some embodiments, the master and slave use a frequency hopping mechanism in order to avoid unauthorized slave devices from using the master as a charger. For example, a particular company that produces slave devices (cell phones, IPod, laptops, etc) and chargers for them could include a frequency hopping mechanism that both the slave and the master devices from that company would know about. For instance, a master detects and charges a slave using frequency f1 and after an elapsed time T1 the master's frequency is changed to f2 and the slave would also know that it has to change to that frequency. After a further elapsed time of T2 the master's frequency is changed to f3 and the slave changes too, etc. An unauthorized slave would not know how to change its frequency with time and as a result of the mismatch between its frequency and that of the master then it will not receive a lot of power from the master. In FIG. 4, the baseband of the transmitter has a frequency hopping unit 460 that generates the clock 463 frequency for the transmitter and receiver. In some embodiments, the transmitter and receiver have the same frequencies while in other embodiments they have different frequencies. In some embodiments the master would have an interface where the user programs the frequency hopping algorithm and downloads it to certain slaves such that the master could only charge and communicate with slave devices that the user chooses. In some embodiments, the master performs time hopping. With time hopping the master transmits at different times based on a known sequence between the master and the slaves. The slaves look at incoming energy at those known specific time intervals. In some embodiment, during each time hop the frequency also changes in order to separate the slaves further.

The slave 470 in FIG. 4 has components similar to the master 405, the main difference is the power generation component 473 which will be discussed in more detail below. The antenna elements 499 of the slave receive the RF waves from the master. The energy from the master's non-modulated RF transmission is converted by the slave's power generator to a supply voltage, Vdd, and is stored in capacitor C 475. This supply voltage is then fed to a voltage converter 477 whose output provides different voltage levels as required by the different slave modules. The outputs from the voltage converter are then provided to the slave's transceiver 480 and processing modules 483 (and networking module if it has one) and power them up. It is also possible that different modules have different Vdd values. If the slave is a sensor the processing module may also optionally have a sensor and associated circuitry. Again, an optional attenuator 485 may be placed in front of the slave's receiver to protect it from being overloaded by the transmitter or by other large incoming signals. The attenuator also allows the receiver to receive when the transmitter transmits. A frequency-selective filter 487 is also used in some embodiments to protect the radio. For instance, when two different frequencies are used for power generation and communication, the filter may be chosen such that it rejects the power frequency but allows the communications frequency. Like the master, the slave also has beam forming 488 for steering its beam, and frequency hopping 481 for limiting power transfer to authorized slaves.

The calibration block 490 calibrates and tunes each antenna to maximize power. It matches the impedance of each antenna with its rectifier. The configuration block 492 controls the calibration block. Since these blocks also need power, some embodiments initially power up a small portion of the circuits. For instance, one or more of the antenna sub-elements receive the RF power. The signal is then rectified (by the rectifier 493), the power absorbed, and converted to a supply voltage, Vdd, for a small power absorber, and stored in a small capacitor 494. This supply voltage is then provided to the slave's configuration 492 and calibration blocks 490. The calibration block calibrates the matching of each antenna or frequency times to the master's frequency each of the antennas in some embodiments. The power generator has a rectifier 495 for each of the antenna sub-element 499 signals. A summer 471 then sums the output of all rectifiers 495. The configuration block monitors each antenna signal (before the power generator's rectifiers as shown in FIG. 4, although it could also monitor after the rectifiers). The configuration block then controls the calibration block to change the antenna tuning in order to maximize the signals. Once the power generator's Vdd reaches a pre-set level the configuration block uses a switch 496 to provide the power to the rest of the system, such as the processing module 483, the RF transceiver 480, and any other modules (e.g. network card module if there is one in the slave). If the slave has a battery 497 the switch is also used in some embodiments to enable battery charging only, or enable battery charging and power-up together so that the slave is able to communicate while the battery is charging. The battery block has associated circuitry to measure its parameters and prevent overcharging. The battery block also includes a regulator and a battery charger unit in some embodiments. For most consumer electronics devices these changes could be incorporated into their battery packs. The slave in some embodiments also has a power management module 498 which performs functions to increase the battery life of the device. For instance, the power management unit in some embodiments puts certain modules in sleep or idle mode, and/or use frequency and voltage scaling to reduce power consumptions.

The calibration block also has a backscattering transceiver in some embodiments. If the RF transceiver is not powered on and the slave needs to communicate back to the master the calibration block uses antenna modulation in the form of backscattering (e.g. acknowledgement that it received data, or transmission of information like MAC ID, name, etc.). The received signals at the slave also include control information, where the master uses a control channel to inform the slaves what to do. The slave's control channel will demodulate and extract the commands for the slave to execute. Control information also includes read commands, write commands, turn on and off commands for the RF transceiver, scheduling for sending and receiving data, configuration and calibration of software radios for different standards.

In some embodiments, the slave stores identifying information about masters (or networked servers) that are authorized to charge the slave, such as the masters' media access control address (MAC ID), network IP address, name, serial number, product name and manufacturer, capabilities, etc. This information is stored in its memory 474 or in its configuration block 492. The slave requests identifying information from the master or the network server 135. The master (or the network server) is also proactive in some embodiments and sends its identifying information to the slave. Identifying information about the masters is stored in a networked database 150 in some embodiments. The slave in some embodiments checks the master's information with its authorized list and if there is not a match the configuration block 492 controls the switch 496 so power does not reach some or all of its circuits and/or battery.

The charging application is for distances of 1 meter or less. The energy efficiency of the system is the efficiency of the transmitter (DC to RF conversion) and the receiver (RF to DC conversion). The path loss is proportional to the inverse of the distance squared and inverse of the frequency squared. For instance at 60 GHz, at a distance of 1 meter the path loss is 64 dB. Thus, if the master transmits 100 mW the receiver gets about 20 dBm, since there is little loss. The conversion of this received RF to DC has about 10-20% efficiency, which translates into 10-20 mW.

This method is used both to charge the slave device and to send data to it in some embodiments. The higher carrier signal frequency enables the use of much smaller antennas. Because the antennas are small, in some embodiments the master devices (and even slave devices) have a number of antennas so that orientation with the charger can vary. When the slave has directional antenna, power efficiency is greatly enhanced. Power efficiency is also most optimal when the antenna of the master and slave are pointing directly towards each other.

In some embodiments, the master is a device (e.g. a PC) that has AC power or has a number of batteries and the slave (e.g. cell phone) has a battery that may require charging. Charging is either initiated by the slave or by the master. For example, the user places the slave near the master and presses a button on either the master or the slave to initiate charging (or charging is initiated after the master polls the slave). The slave makes a digital request to the master to be charged. Each antenna on the master receives a DC current. However, the antenna that is pointing to the slave device's antenna will receive the largest current. Each of the master's antennas effectively acts as a USB port since the antennas are used for communication as well as charging. If there are more than one slave then the master in some embodiments powers up all of them if need be and communicate with all of them using multiplexing. This eliminates the need for the master device to have multiple USB polls. Specifically, currently for each device there is a need for one USB port. For example, there is one for the mouse, one for the keyboard, one for a memory stick, etc. Using the embodiments of the current invention, they can all share the same wireless communication link with multiplexing for communication. For a USB type slave device that has no battery the master just acts like a remote battery so that the slave is able to communicate. For a more powerful slave device, such as a cell phone, the master acts like a charger and a communication device. If the stave has sensors (e.g. temperature, gyrator, pressure, and heart monitor) with electronic circuitry then they are powered up by the master, perform their sensing functions and communicate their data to the master, a network server, or some other device. In some embodiments, either or both the master and the slave have a touch screen and/or keyboard. For example, the master's keyboard is used for input and its touch screen is used for both input and output. Input data is then communicated to the slave. Likewise, when the slave has a keyboard and/or touch screen, input data is displayed on the slave's screen and is optionally communicated to the master.

Figure 5:
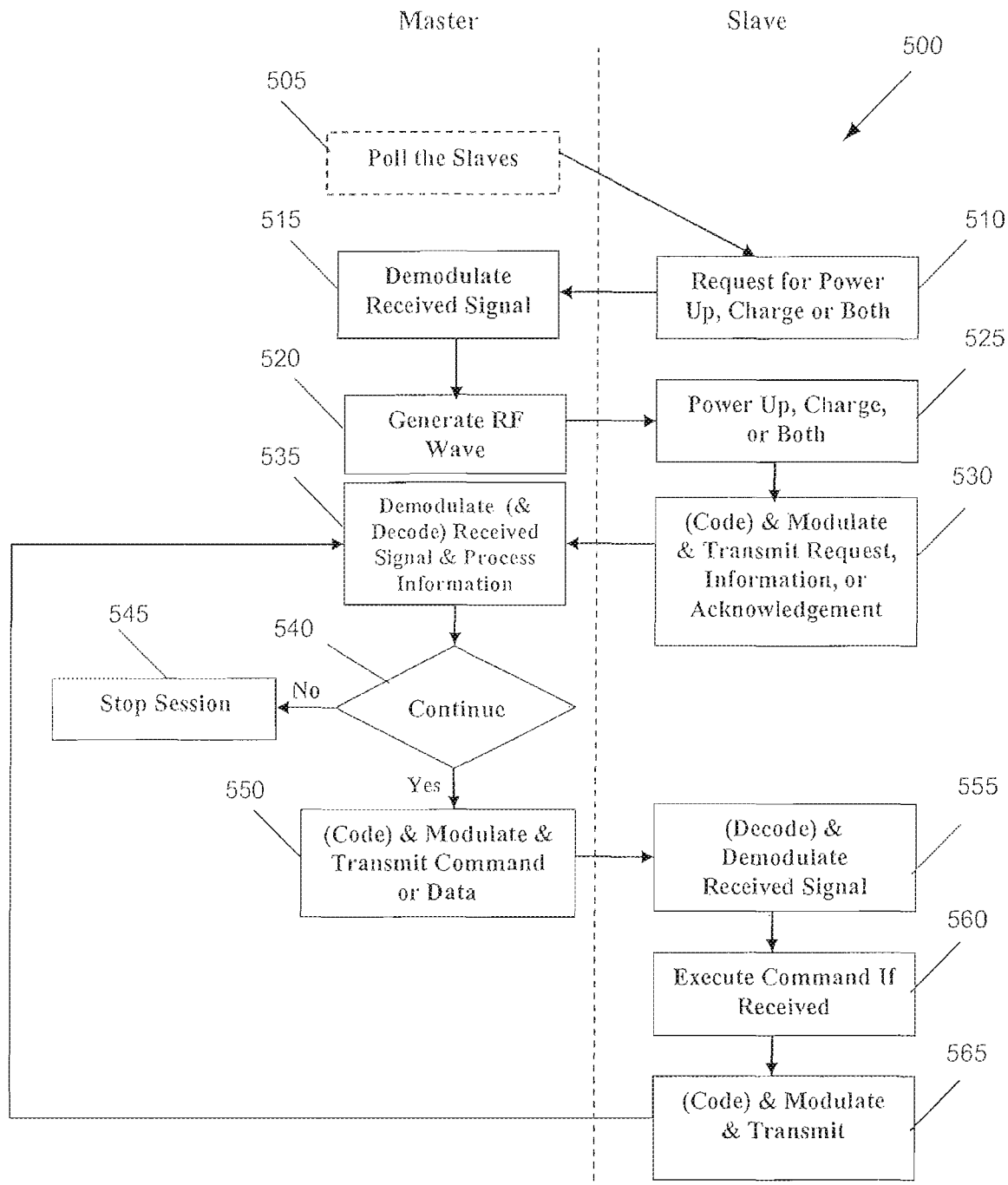
FIG. 5 conceptually illustrates a process for master-slave charging and communication in some embodiments of the invention.

FIG. 5 conceptually illustrates a process 500 for master-slave charging and communication in some embodiments of the invention. The exact sequence of events and command/information flows depends on whether the master or the slave initiates the communications. The commands are mostly transmitted over the control channel that uses a simpler modulation (e.g. AM, FM) than the data channel (although some embodiments send commands over the data channel). Channel coding is an optional step prior to modulation to improve data transmission and recovery under noisy conditions.

As shown in FIG. 5, the master powers-up (at 505) the slave. The power up is initiated by either the master or by the slave. For instance: (a) the slave makes a request for power (e.g. user presses a button on the slave for power or a low power slave automatically requests to be charged provided it has a battery charge, (b) the slave does not have charge, but the master polls the slave (either regularly or by manually pressing a button on the master) and then the slave requests power (c) the master detects the slave when it gets close to it, polls it and then the slave requests power. In some embodiments, when the master has AC power, the master goes to discovery mode where it polls frequently and goes off. In some embodiments, when a master has battery, the master goes to discovery mode and if it finds no slaves it slowly backs off (for instance going from 1 minute polling interval to 2 minute polling interval, then to 3 minute polling interval, etc.)

Next, slave sends (at 510) request for power. Master receives the slave's request for power, demodulates (at 515) it, and in response generates (at 520) an RF wave. In some implementations the master automatically charges the slave or have some charging rules (e.g. if battery charge of slave is less than 50% then charge slave automatically). In these embodiments, operations 510 and 515 are skipped.

The slave receives the RF wave from the master, and the slave's power generator component converts the RF wave energy to a supply voltage. This is used (at 525) to power-up the slave, charge its battery if it has one, or both. The slave then transmits (at 530) information about itself (or its surrounding if it is a sensor) or makes (at 530) requests. The slave optionally codes the information before modulation in some embodiments. For instance, the slave transmits information such as "I am this particular device", "I have data to be read", "I need to be charged", etc. Active slaves (e.g. cell phones or toys with batteries) use the power of the master instead of their own battery in some embodiments.

The master then receives and demodulates (at 535) the slave's information/request (and decodes if necessary). The master's processing module determines (at 540) whether the master continues the session. When the master determines that the session shall not be continued, the session is stopped (at 545). When the session continues, the master's processing module generates (at 550) commands (e.g. read from memory, write to memory, put into idle energy state, or other specific commands) which are optionally coded and modulated by the master's transceiver and transmitted.

The slave receives the master's signal, demodulates (at 555) the received signal, and decodes the signal if necessary. Next, the slave executes (at 560) the command (e.g. read, write, idle, specific command). In some embodiments, the slave optionally codes (at 565) status information. The slave then modulates (at 565) and transmits (at 565) status information or other requests back to the master (e.g. the read data, write successful status, command successful status, acknowledgements). The master demodulates (at 535) the slave's transmission and its processing module determines if it continues the session (decision to continue is possibly based on the information sent by the slave). In some embodiments, the slave's status transmission information includes low battery/charge information or requests for charging (at 565), and the master's processing module processes the information/requests and charges the slave (at 535).

Figure 6:
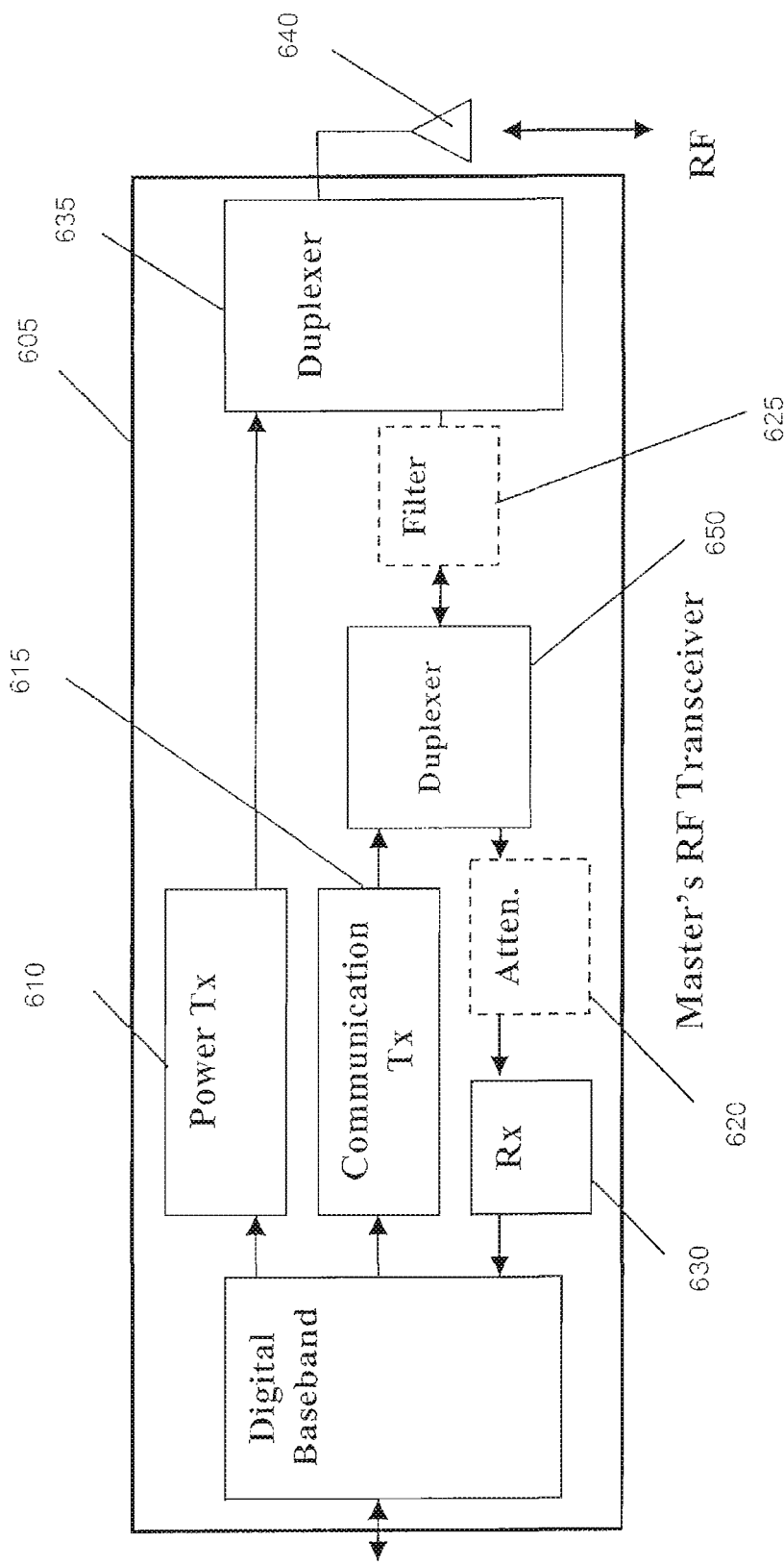
FIG. 6 conceptually illustrates a master two different transmitters for power generation and communication in some embodiments of the invention.

FIG. 6 conceptually illustrates a master with different transmitters for power generation and communication in some embodiments of the invention. One transmitter of each type is shown for simplicity. As shown, the master 605 includes two separate transmitters (possibly with different frequencies) that are used for power generation and communication. The power transmitter 610 performs the function of a dedicated battery for the slaves. In some embodiments the power transmitter has narrow bandwidth but is high power compared to the communication transmitter or more wideband transmitters. A more focused antenna beam and a higher power transmitter increase the power transfer to the slave. The communication transmitter 615 and the power transmitter 610 in some embodiments have different frequencies from while in some embodiments the two transmitters have the same frequencies. In some embodiments, the frequencies are Federal Communications Commission (FCC) approved. The attenuator 620 prevents the transmitter from overloading the receiver 630 and allows the receiver to receive when the communication transmitter transmits. The transceiver's transmitter and receiver use a duplexer 650 that allows bi-directional communication over a single channel and antenna. In some embodiments, the filter 625 is chosen such that it rejects the power frequency but allows the communication frequency. A duplexer or combiner/de-combiner 635 is used with a single antenna 640.

Figure 7:
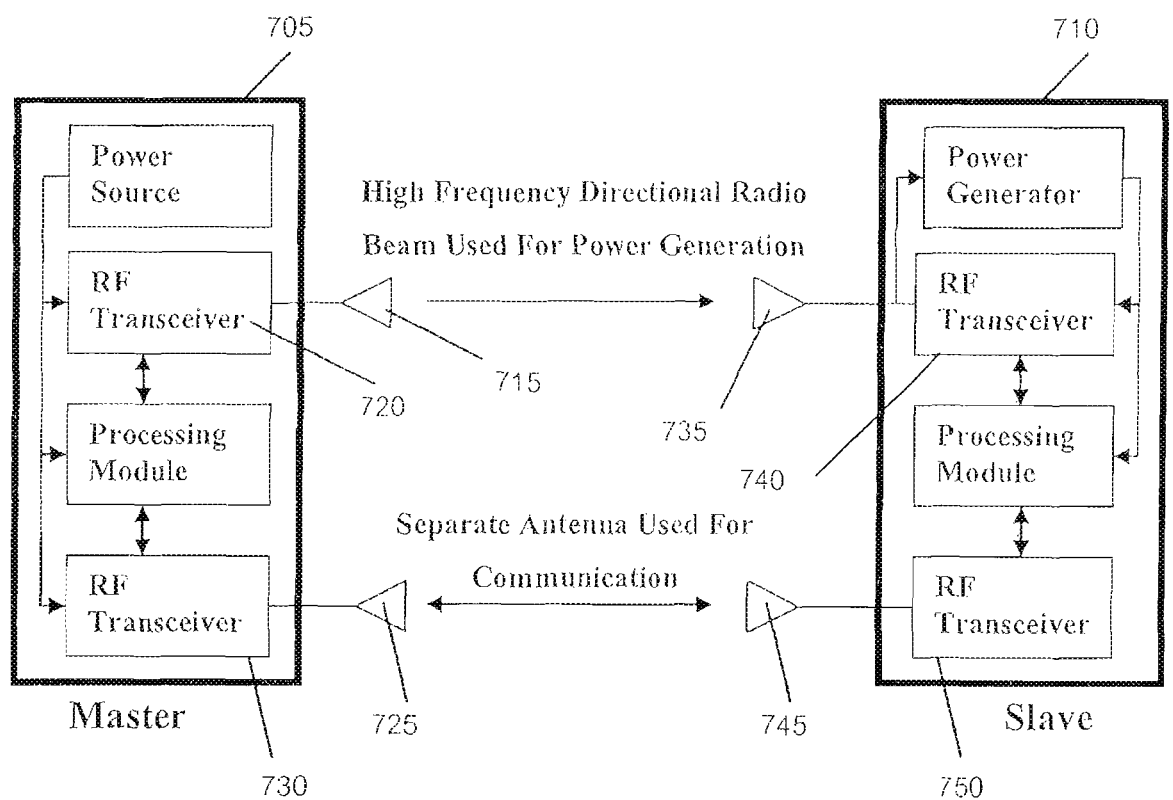
FIG. 7 conceptually illustrates a master and a slave that each include two separate antennas/transceivers, one for power generation and one for communication in some embodiments of the invention.

FIG. 7 conceptually illustrates a master and a slave that each includes separate antennas/transceivers for power generation and for communication in some embodiments of the invention. For simplicity, only one antenna/transceiver of each type is shown. As shown, the master 705 includes an antenna 715 and a transceiver 720 for power generation. The master also includes an antenna 725 and a transceiver 730 for communication. Similarly, the slave 710 includes an antenna 735 and a transceiver 740 for power generation and an antenna 745 and a transceiver 750 for communication. Thus, the antenna used for power generation has a directional focused beam pattern and is used with a high frequency to generate power at the slave. The control channel runs on the power transmitter's channel in some embodiments while the control channel runs on the communication transmitter's channel in other embodiments.

Figure 8:
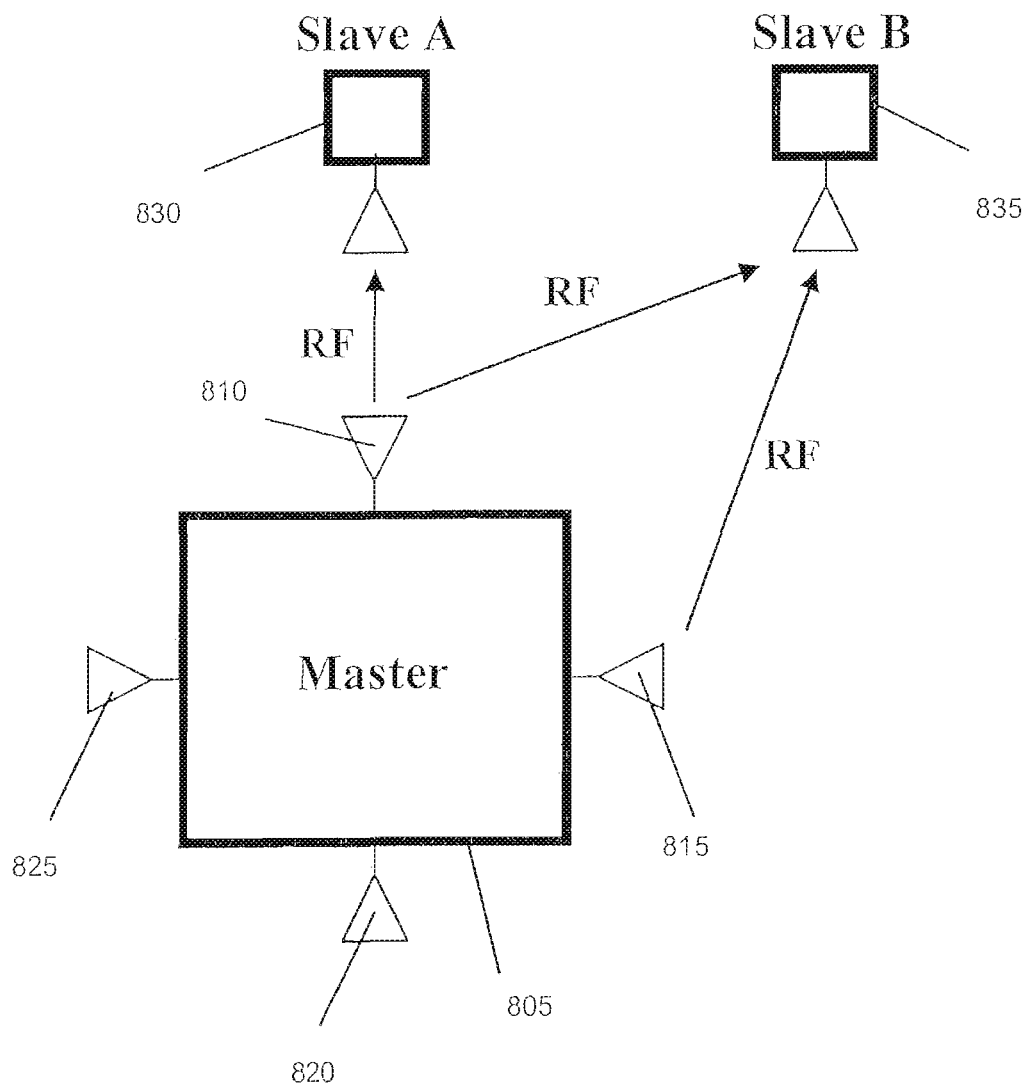
FIG. 8 conceptually illustrates a master in some embodiments of the invention that uses beam steering to change the direction of the beam when the slave is not directly in front of its beam.

FIG. 8 conceptually illustrates a master in some embodiments that uses beam steering to change the direction of the beam when the slave is not directly in front of its beam of the invention. As shown, the master 805 has four antennas 810-825. Slave A 830 is directly in front of antenna 810 and receives most of the energy of the RF beam of that antenna without any steering of the beam. Slave B 835, however, is located at all angle to all of the master's antenna beams. The efficiency of the system is less when the slave is positioned at an angle to the main beam's antenna. However, antenna 810 and 815 use beam steering to target the antenna of slave B 835.

Furthermore, using both antennas 810 and 815 improves efficiency because the power generator of slave B 835 uses the energy simultaneously received from both antennas to generate a supply voltage. Once slave B 835 is powered up it uses one of the antennas for communication (e.g. the antenna with the more reliable signal or the stronger signal). As described by reference to FIG. 1 above, more than one master (either simultaneously or separately) charge a single slave (e.g. masters B 115 and C 120 charge slave 6 in FIG. 1) or several slaves in some embodiments. In some embodiments the masters communicate with each other or alternatively a network server or remote user configures them to change their beam steering and other system parameters such that they maximize power transfer to a single slave or a plurality of slaves.

Figure 9:
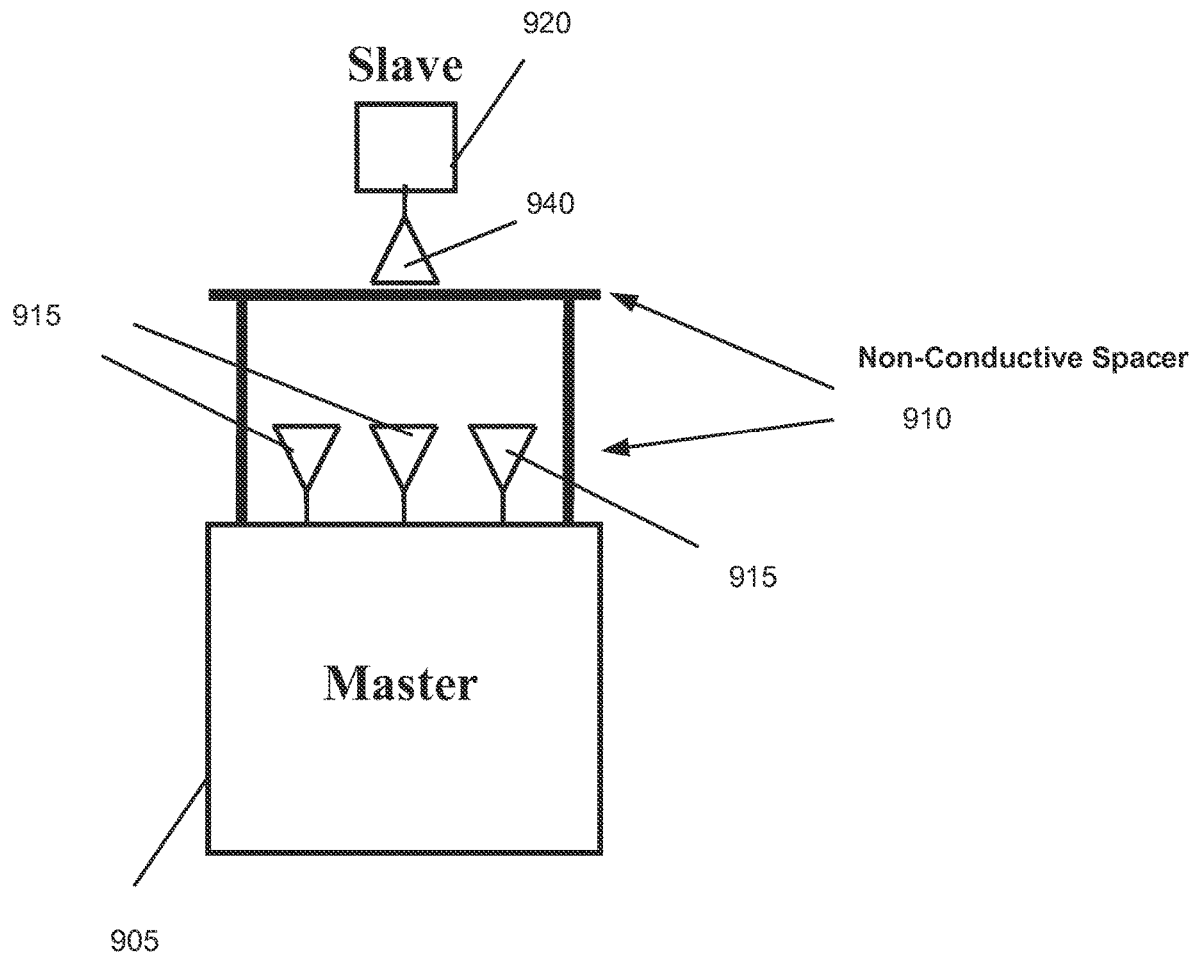
FIG. 9 conceptually illustrates a multi-antenna RF master that has a non-conductive spacer material in front of its antenna in some embodiments of the invention.

FIG. 9 conceptually illustrates a multi-antenna RF master in some embodiments of the invention that has a non-conductive spacer material (e.g., plastic) in front of its antenna 915. This spacer 910 is used to enable the slave 920 to sit on it or get close to it. This creates a separation distance of several wavelengths between the master 905 antennas 915 and the slave 920 antennas 940 so that RF is used for charging. For instance, for a single antenna a separation of two or more wavelengths is needed. For multiple antennas more wavelengths are required, the number of which increases with the number of antennas for optimal beam forming. This could for example be used for wireless charging and wireless USB communication (since each of the master's antennas effectively acts as a USB port that is used for communication as well as charging). Without the separator the slave and the master could be too close to each other because of the short wavelengths of high frequency RF. If the master and the slave are too close to each other, some embodiments use induction charging instead of RF charging. Although FIG. 9 shows one slave antenna and several master antennas, in different embodiments of the invention either the slave or the master has one antenna, many antennas, or one or more antennas with sub-elements. In some embodiments, a slave has a non-conductive spacer material (e.g., plastic) in front of its antenna 940 (not shown) to enable the slave to sit on the master or come close to it.

III. Charging with Induction

Figure 10:
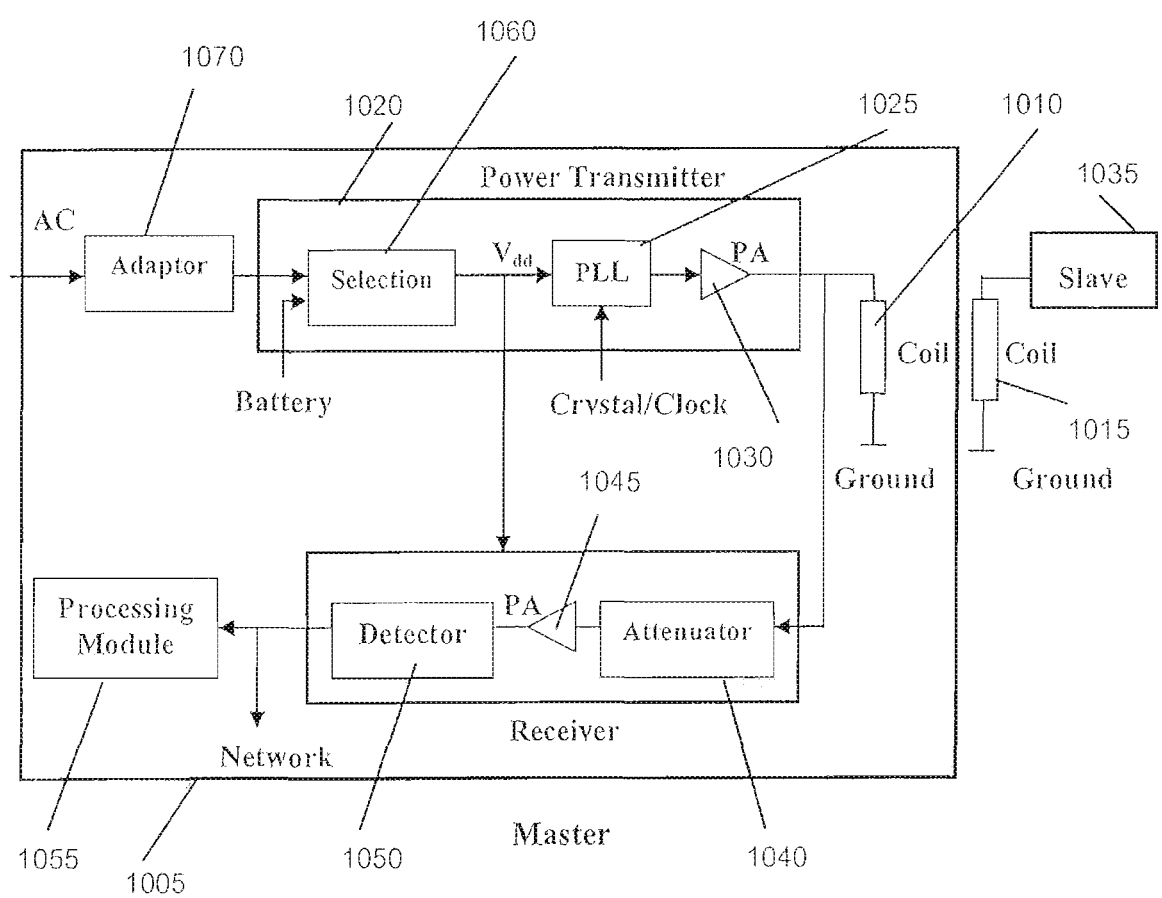
FIG. 10 conceptually illustrates a master that uses induction to charge and communicate with a slave in some embodiments of the invention.

FIG. 10 conceptually illustrates a master that uses induction to charge and communicate with a slave in some embodiments of the invention. The master 1005 supplies its primary coil 1010 with an alternating current, thereby creating an AC magnetic field. This magnetic field generates a voltage across the receiver's coil 1015, which is rectified and smoothed with capacitors (not shown), and used for charging and communication. The power source for the master in different embodiments is an AC source that is converted to DC by an adaptor 1070, a battery, or other mechanisms (e.g. induction from another master induction charger). A selection switch 1060 in some embodiments selects amongst the different power source options and provides the Vdd to the master's power transmitter. In some embodiments, the power transmitter 1020 uses a Phase Lock Loop (PLL) 1025 that uses a crystal's frequency to synthesize a new frequency. Alternatively, the power generator in some embodiments uses a Direct Digital Frequency Synthesizer (DDFS). The power transmitter then uses a Power Amplifier (PA) 1030 to drive its coil. In the embodiments shown in this figure and the other following figures that illustrate induction, one end of the coil is connected to the PA with the other end grounded. However, some embodiments use a differential coil where the two ends of the coil are connected to the + and − input of the PA. If no modulation is used, the transmitted energy is used to charge a slave through induction of the slave's coil. But if the transmitted signal is modulated (amplitude, frequency, phase or a combination) the signal is also used to transmit data as well as power in some embodiments. In some embodiments, when the transmitter is not sending data it just charges the slave 1035 or the slave communicates back on the same frequency or a close frequency. The slaves use backscattering to send information to the master. When the master is in receiving mode, the signal coming from its coil to the receiver is detected. The signal level is adjusted by an attenuator 1040 and a power amplifier 1045. The detector 1050 then demodulates the signal. The resulting data is then passed on to the processing module 1055 that has a digital signal processing unit, a processor and memory, as well as a networking card (not shown).

Figure 11:
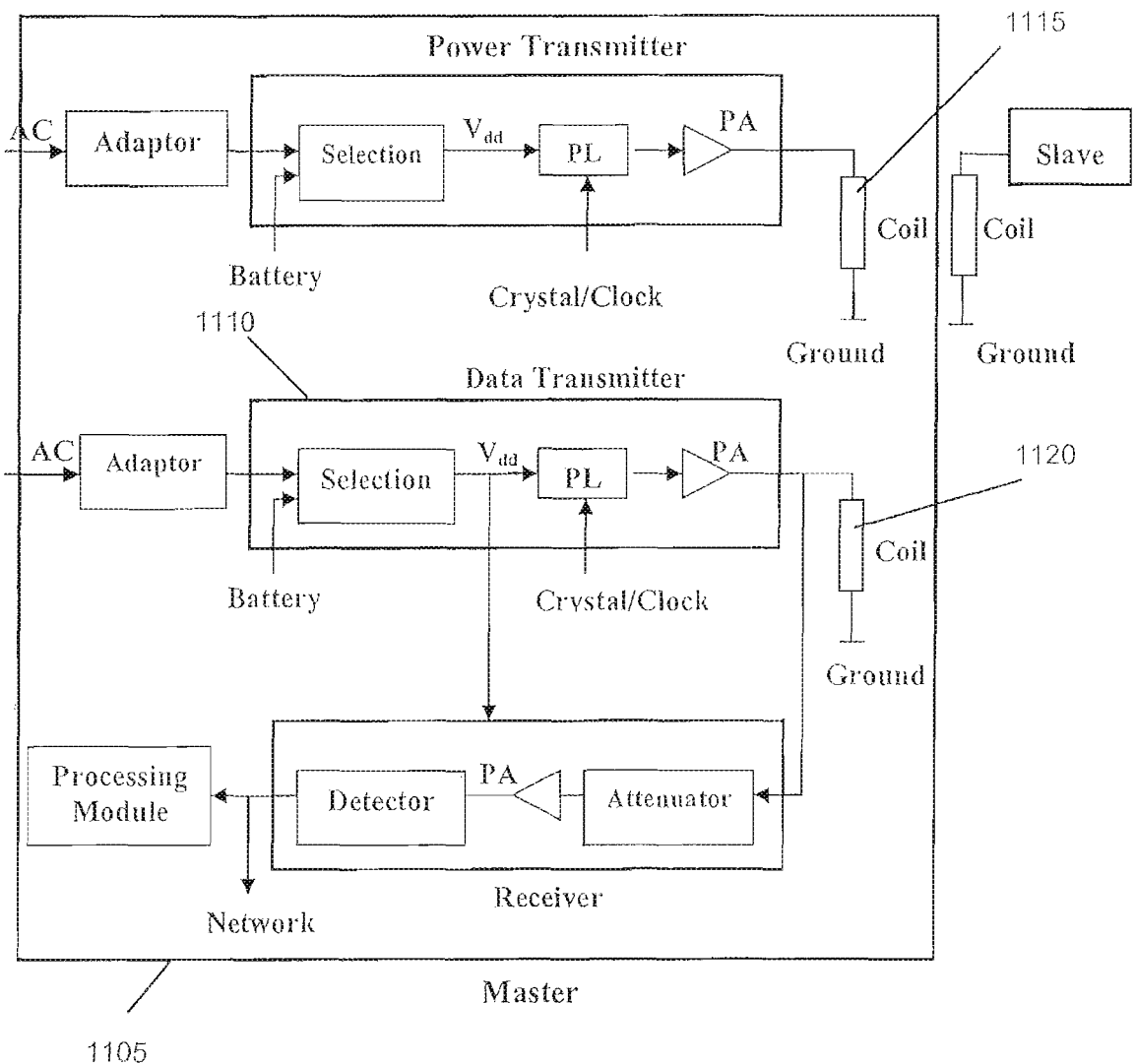
FIG. 11 conceptually illustrates a master in some embodiments of the invention that uses the power transmitter for charging, and a separate transmitter for data transmission.

FIG. 11 conceptually illustrates a master in some embodiments of the invention that uses the power transmitter for charging, and a separate transmitter for data transmission. Other components of FIG. 11 are similar to FIG. 10. In some embodiments this data transmitter 1110 functions similar to Near Field Communication (NFC) since NFC also uses induction over very short distances for communication. FIG. 11 shows two separate coils 1115 and 1120 for the power transmitter and the data transmitter respectively. However, some embodiments have one physical coil used for both transmitters, where the power transmitter uses the entire coil and the data transmitter uses all or a smaller section of the same coil. This has the advantage of reducing the number of coils.

FIGS. 10 and 11 show the master with one coil per transmitter. However, in some embodiments the master has a number of coils so that the master charges and communicates with several slaves, or is able to transmit more power. For instance, networked masters in some embodiments have coils that are built-in to conference room tables and marked so that meeting participants can wirelessly charge their devices, connect to each other or to the Intranet/Internet, and transmit/receive information (this also applies to RF beam chargers where RF beam chargers such as master devices shown in FIGS. 2-4 and 6-9 are built-in conference room tables and marked so that users can wirelessly charge their devices, connect to each other, connect to a networked server or to the Intranet/Internet, and transmit/receive information). Alternatively, the master has the form factor of a light weight pad that is used at home, in the car, on the go, or at work to charge and communicate with a number of devices. Such multi-coil or RF beam masters, tables or pads are smarter in some embodiments and have additional dedicated functions that resemble a small computer. For instance, in some embodiments they have a credit card reader so that users of slaves are not only able to charge their devices but also make payment transactions. Thus, a subset of the coils (or antennas) is dedicated to interface with near field communication (NFC) devices. For example, in some embodiments of the invention phones with NFC capabilities are not only charged but they are also used for contactless payment so that the user places the phone near those coils (or RF beams of a master in the case of RF-based master) in order to get authenticated and transmit payment information to a secured server on the Internet. Alternatively, credit cards in some embodiments have a chip so that they transmit their information to the master device. The users may also choose to enter the payment information manually if they choose to do so. Some of the master's coils (or RF beam of a master in the case of RF-based master) are dedicated and optimized for communication, instead of having all coils be responsible for charging and communication in some embodiments. Likewise, some coils are dedicated and optimized for charging in some embodiments. These multi-coil masters, tables or light-weight portable pads use either a wireline or wireless connection to connect to the Internet, or an Intranet. They use their connection in some embodiments to communicate with a fax/printer for faxing and printing functions. In some embodiments these multi-coil masters, tables or light-weight portable pads charge a cell phone and then use the cell phone's networking functions (cellular, Wi Fi, Bluetooth®) to connect to an Intranet/Internet/server for authentication, web browsing, secure transaction, printing/faxing, etc. In other embodiments a tablet device (such as an IPad®) has a light-weight pad attached to it such that the tablet is wirelessly charged and then become a wireless charger to charge a cell phone. In other embodiments multi-coil masters, tables or light-weight portable pads have photocells to get charged and then charge other devices such as cell phones wirelessly. In yet other embodiments light-weight portable pads have USB or other types of ports for charging and communicating with other devices in a car (both wired or wirelessly). Such pads also have built-in GPS and Wireless LAN functionality in some embodiments.

If a master device has an array of n coils all n coils are used to charge and communicate with one slave in some embodiments, or all n coils are used for a number of slaves in some embodiments. The same channel is used for power transfer and then communication in some embodiments. In some embodiments, every coil has a built-in transceiver. In other embodiments a subset of the coils has built-in transceivers. During a calibration and configuration stage the master and the slave exchange information in order to get to know each other. For example, the master instructs which slaves should be on or off in some embodiments. Frequency and time hopping are coordinated between the master and the slaves in some embodiments for selection amongst a plurality of slaves, as well as additional security. Thus, the master transmits configuration information to the slaves, such as coil frequency and hopping algorithms. The slaves send back acknowledgements or the data to make sure they received it correctly. The slaves also transmit their voltage and current requirements to the master in some embodiments. If a coil at position P at time t has frequency f then it can be represented by (f, t, P). Frequency hopping is a method where each coil in the matrix of coils is driven by a different frequency f at different time periods. For example coil 1 has frequency f1 for t1 seconds, frequency f2 for t2 seconds, etc. Time hopping is the process where each coil in the matrix is turned on and off at different time periods.

Figure 12:
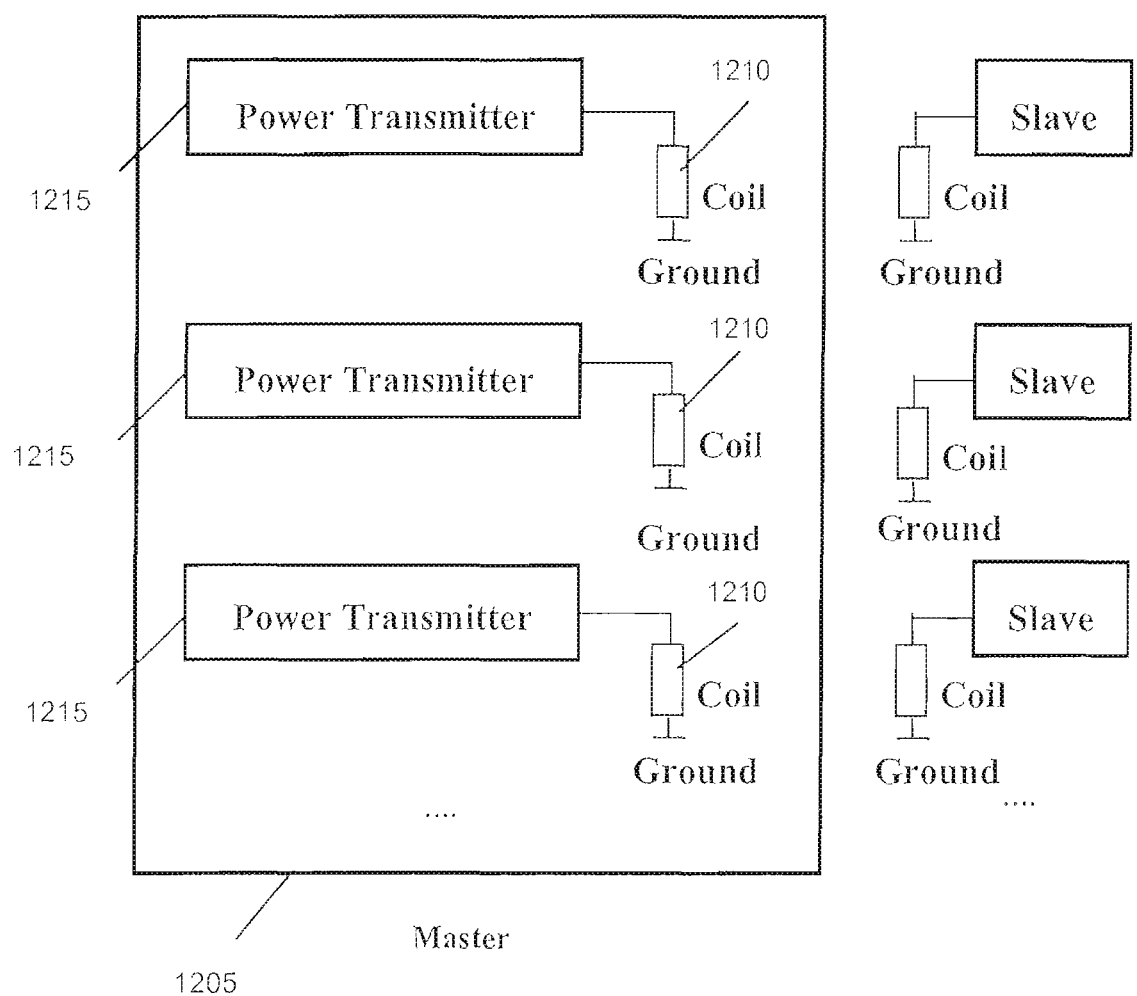
FIG. 12 conceptually illustrates a master that has a power transmitter for each of its coils in some embodiments of the invention.
Figure 13:
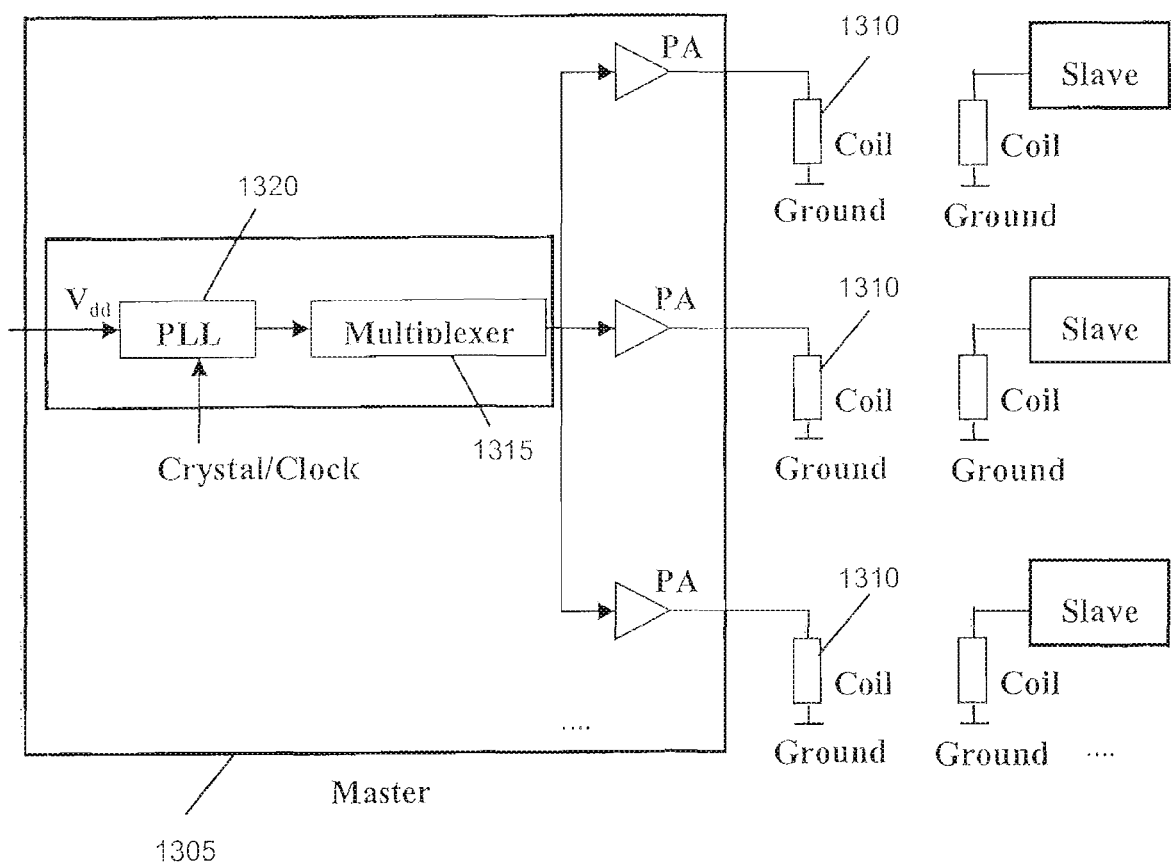
FIG. 13 conceptually illustrates a master in some embodiments of the invention with coils that have the same frequency and a multiplexer to activate coils at different times.

FIG. 12 conceptually illustrates a master 1205 that has a power transmitter for each of its coils 1210 in some embodiments of the invention. Thus, each coil (or a subset of the coils) has a different frequency to implement frequency hopping. In some embodiments, the master 1205 also makes the power on each transmitter 1215 on and off to have time hopping. Other components of the master (which in different embodiments are similar to components shown in FIG. 10, 11, or 20, or 21) are not shown for simplicity. FIG. 13 conceptually illustrates a master in some embodiments with coils 1310 that have the same frequency and a multiplexer 1315 to activate coils at different times. The PLL 1320 in some embodiments also change the frequency if the master wants to have both frequency and time hopping. Other components of the master are not shown for simplicity.

Figure 14:
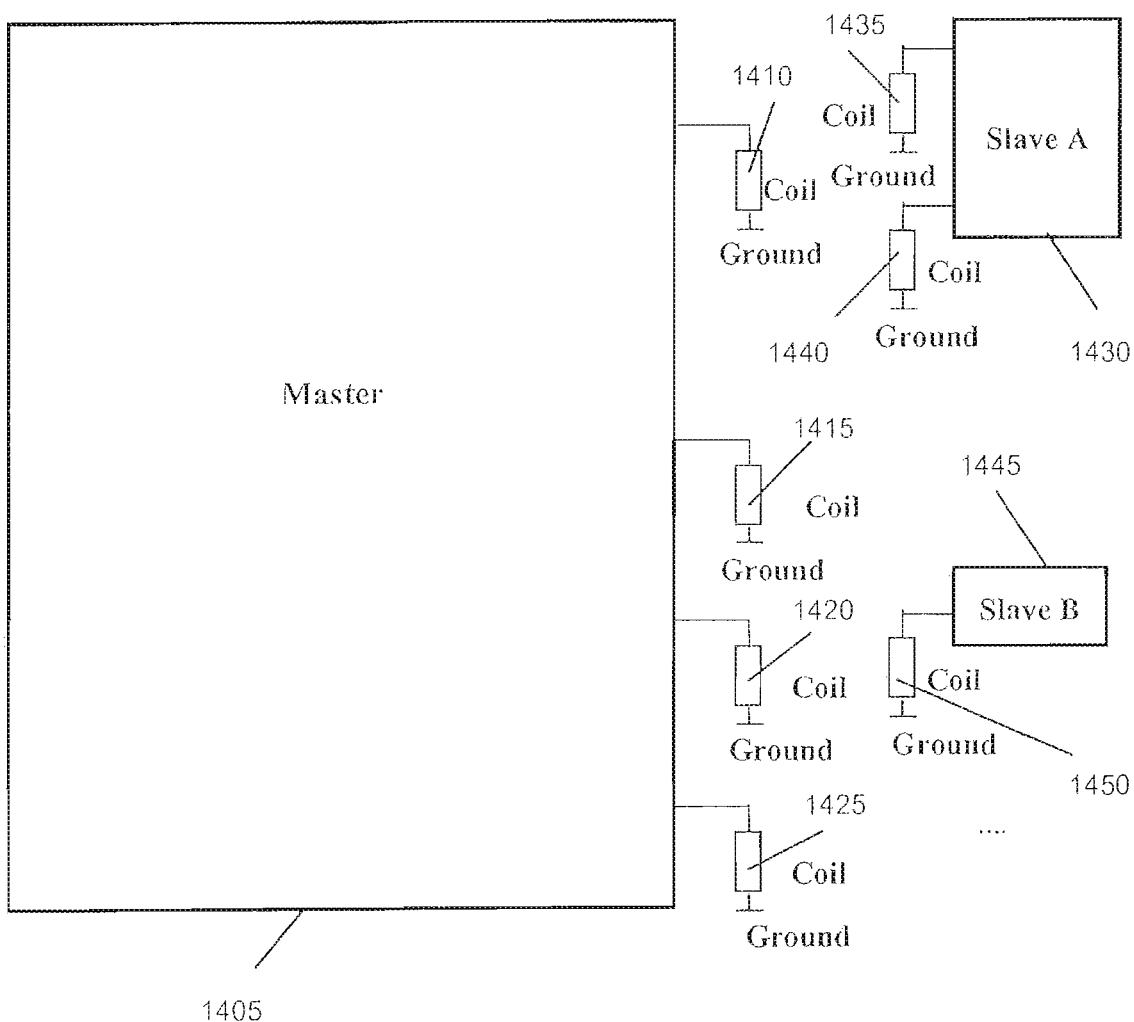
FIG. 14 conceptually illustrates induction between the master and the slave by using more than one coil on the master or the slave in some embodiments of the invention.

FIG. 14 conceptually illustrates induction in some embodiments between the master and the slave by using more than one coil on the master or the slave in order to increase power and communication efficiency. Other components of the master (which in different embodiments are similar to components shown in FIG. 10, 11, or 20, or 21) are not shown for simplicity. As shown, the master 1405 includes four coils 1410-1425, slave A 1430 includes two coils 1435-1440, and slave B 1445 includes one coil 1450. As shown in the example of FIG. 14, slave A's two coils 1435-1440 couple with one coil 1410 on the master 1405. Likewise, the master's coils 1415-1425 couple with slave B's one coil 1450. In the general case in some embodiments X coils on the master couple with Y coils on the slave. In some embodiments, coupled master coils such as 1415-1425 have the same frequency. In other embodiments, the coils have different frequencies f1, f2 and f3. In these embodiments, the frequencies are within the bandwidth of the transformer system so that they couple and their power is added together.

In some embodiments, both the master and the slave have a matrix of coils. Different embodiments arrange the coils differently, for instance matrix of coils are arranged in 1D (one line), 2D (a plane), or 3D (multiple planes covering a volume). Some embodiments arrange the coils in different patterns (rectangular grid, triangular grid, circular grid, hexagonal grid, irregular grid, etc). The master then requests the slave's coil patterns. The slave sends it coil pattern to the master. The master then activates a subset of its coils in order to generate a transmit coil pattern that transfers maximum power to the slave. The slave then informs the master how much power each of its coils receives. The master then changes it's transmit coil pattern in order to optimize power transfer to the slave. In some embodiments this process is repeated until optimum power transfer is achieved.

Figure 15:
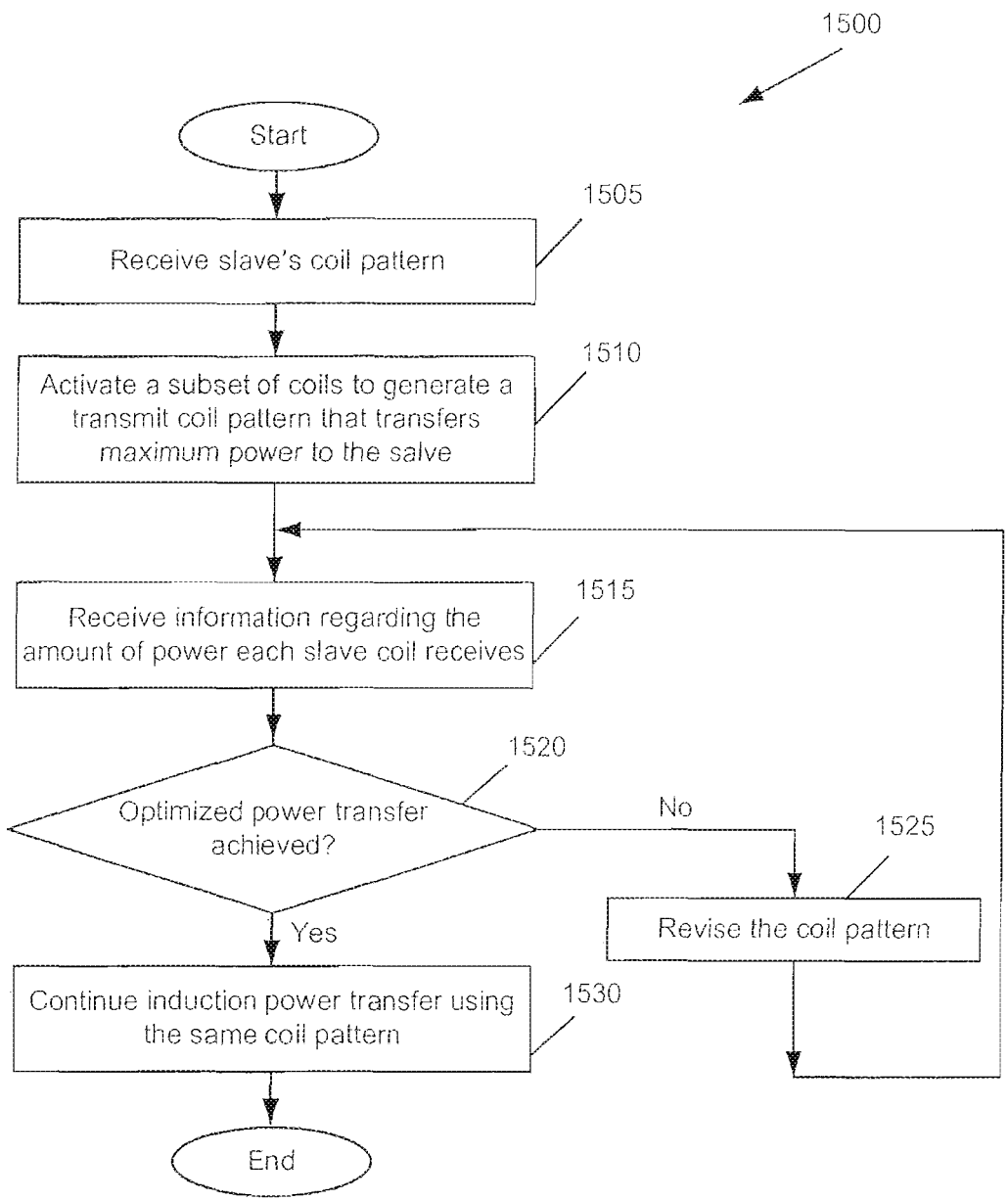
FIG. 15 conceptually illustrates a process of some embodiments of the invention to change a master device's coil pattern in some embodiments of the invention.

FIG. 15 conceptually illustrates a process 1500 of some embodiments of the invention to change a master device's coil pattern in some embodiments of the invention. As shown, process 1500 receives (at 1505) the slave's coil pattern. Next, the process activates (at 1510) some or all of master coils in order to transmit maximum induction power to the salve's coils.

Next, the process receives (at 1515) information regarding the amount of power each slave coil receives. In different embodiments, the master receives this information from the slave (1) using RFID and backscattering techniques, (2) through RF data transmission from the slave's RF antennas, or (3) through data transmission from one or more of the slave's coils.

The process then determines (at 1520) whether on optimized power transfer is achieved (e.g., when the rate of power transfer satisfies a certain threshold). When the process determines that optimized power transfer is achieved, the process continues (at 1530) induction power transfer using the same coil pattern. The power transfer continues until a set of predetermined criteria (e.g., a certain amount of time elapses a signal is received from the slave, slave's coil impedance changes, etc.). The process then exits.

Otherwise, when the process determines that optimized power transfer is not achieved, the process changes (at 1530) the transmit coil pattern. The process then proceeds to 1515 which was described above.

Figure 16:
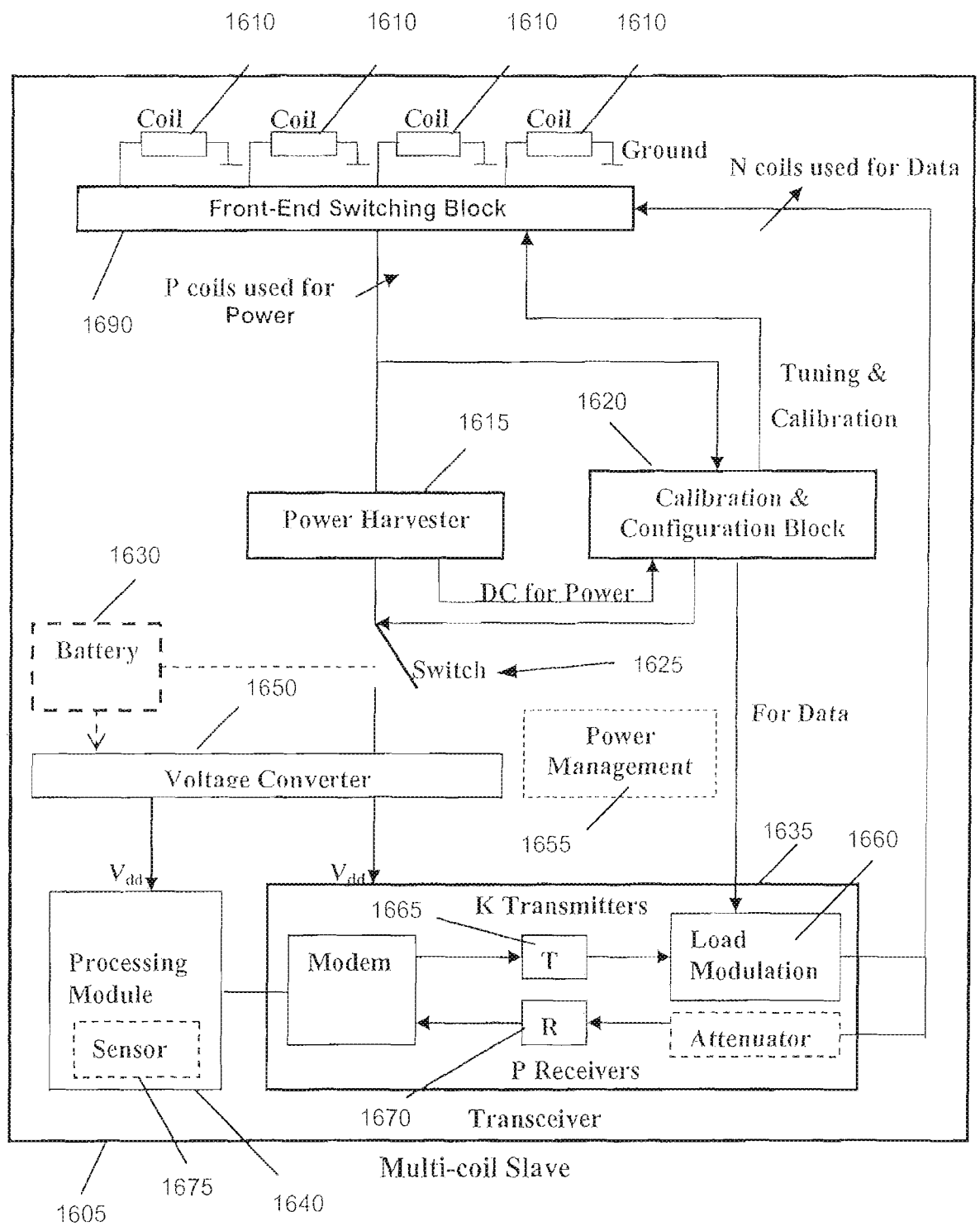
FIG. 16 conceptually illustrates a multi-coil slave with induction charging in some embodiments of the invention.

FIG. 16 conceptually illustrates a multi-coil slave with induction charging in some embodiments of the invention. FIG. 16 shows a general diagram of a slave device 1605 that has M coils 1610. While in some embodiments slave devices have one coil in other embodiment (such as the embodiment shown in FIG. 16) have more than one coil. As shown, a P number of coils are used for power absorption and an N number of coils are used for data communication, where P≤M and N≤M and P+N=M. The system is reconfigurable so that the numbers P and N are changed so that different numbers of coils are used for power and data communication as needed. When a slave comes close to a master the master detects a change in its load. The master then gives power to the slave. The AC magnetic fields generated by the primary coils of the master charger generate voltages across the coils of the slave. The power harvester 1615 rectifies and smoothes these voltages and its output are used for charging and power. As shown, the power harvester 1615 is connected to the coils through the front-end switching block 1690. Initially, a small portion of the circuits, such as the calibration and configuration block 1620, are turned on with DC power from the power harvester. Then the master uses data modulation or some other modulation method to send configuration information to the slave's calibration and configuration block. This configuration information includes one or more of the master's frequency, master's data and modulation method, and master's identifying information. The slave's calibration and configuration block monitors 1620 the signal before or after the power harvester 1615 and uses the configuration information together with tuning, calibration, and impedance matching of each coil with its rectifier (not shown) to maximize the signal. After the signal is maximized then the slave's calibration and configuration block adjusts a switch 1625 so that power becomes available for the battery 1630 (if the slave has one) and/or other circuits such as the data transceiver 1635 and the processing module 1640. The battery block 1630 has associated circuitry to measure its parameters and prevent overcharging. The battery block 1630 also includes a regulator and a battery charger unit (not shown) in some embodiments. A voltage converter 1650 is used to provide different voltage levels as required by the different slave modules. The slave in some embodiments also has a power management module 1655 to increase the battery life of the device.

In some embodiments the slave stores identifying information about masters (or networked servers) that are authorized to charge it. This is stored either in the slave's calibration and configuration block or the slave's memory (not shown). The slave checks the configuration information sent from the master to the slave for the master's identifying information. If the information is not included the slave requests it. The slave then checks this information with the authorized list and if there is not a match the slave's calibration and configuration block disables charging and/or power-up by controlling the position of the switch.

The slave's data transceiver 1635 is reconfigurable so that K transmitters 1665 and P receivers 1670 are used. For instance, more than one transmitter in some embodiments is used to drive a single coil. Likewise, more than one receiver in some embodiments is used to receive from a single coil. In some embodiments, a master device has a similar configuration. If the slave is only charging its battery, once the battery is charged the slave in some embodiments disables its coil(s) or changes its impedance so that the master knows the slave does not need more power for charging. During data communication the load modulation unit 1660 modulates the load for the coils. When the load on the slave's coils changes then the system acts like a transformer and the same effect is shown on the transmitter's coils through coupling. The changes required to implement this system can be incorporated into the battery pack of most electronics systems (conventional battery packs typically include rechargeable batteries that use AC power adapters. These battery packs could be changed to include the components of FIG. 16 instead).

The slave in some embodiments optionally has sensors 1675 with electronic circuitry. Once the slave is powered up the sensors perform their sensing functions and communicate their data to the induction charger, another master, or a network server. Some examples of sensors are temperature, gyrator, pressure, and heart monitor. The master and the slave in some embodiments optionally have a touch screen and/or keyboard for entering data which is displayed on the screen and/or communicated, respectively, to the slave and the master.

Figure 17:
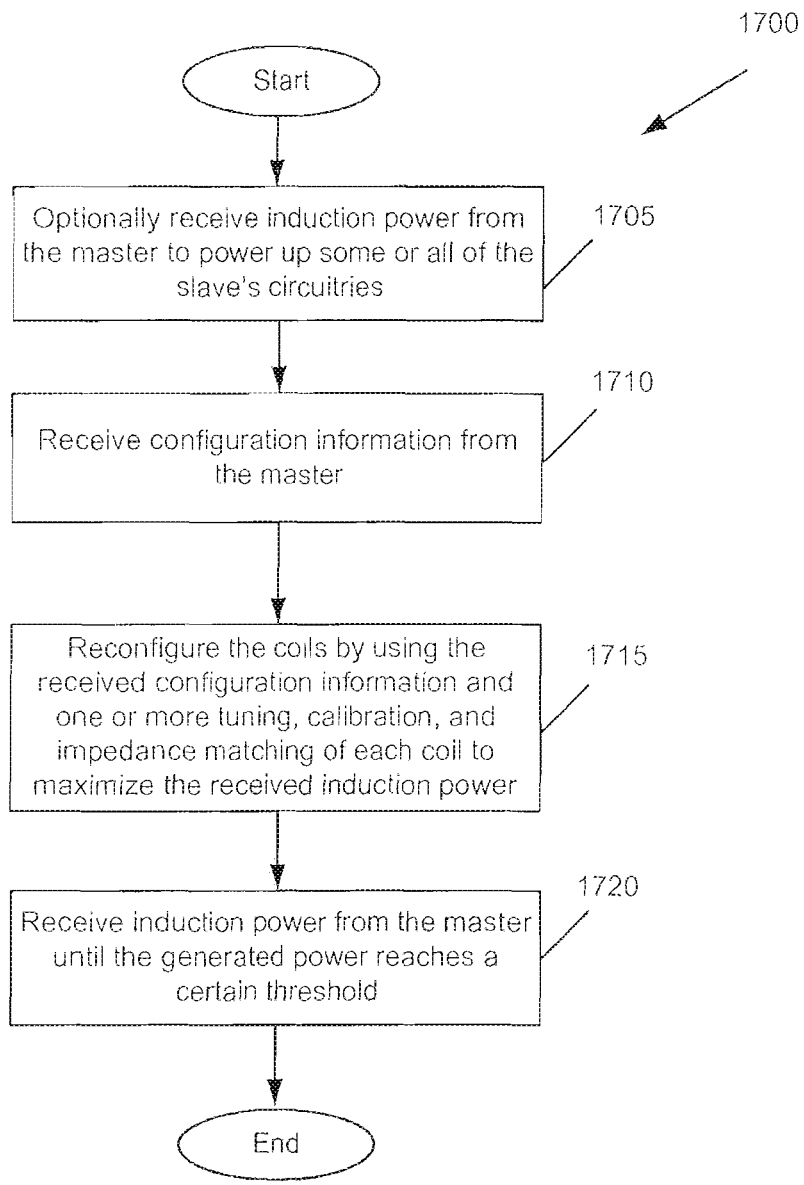
FIG. 17 conceptually illustrates a process for reconfiguring coils of a slave device in some embodiments of the invention.

FIG. 17 conceptually illustrates a process 1700 for reconfiguring coils of a slave device in some embodiments of the invention. As shown, the slave optionally receives (at 1705) induction power for a certain period of time from the master to power up some or all of the slave's circuitries. In some embodiments, when the slave initially has more than a certain amount of power, operation 1705 is skipped.

Next, the process receives (at 1710) configuration information from the master. The master configuration information includes one or more of the master's operating parameters such as the operating wireless communication frequency of the master (which is used for communication between the master and slave), master's data and modulation method, and master's identifying information. The process then reconfigures (at 1715) the slave's coils by using the received configuration information and one or more tuning, calibration, and impedance matching to maximize the received induction power. Coarse calibration and fine tuning are performed in some embodiments to ensure that all elements on the master and slave have the same frequency and are tuned for it. Likewise, impedance matching is performed in some embodiments such that the master and the slave are matched for communication. The process then receives (at 1720) induction power from the master device until the generated power in the slave reaches a certain threshold. The process then exits.

Figure 18:
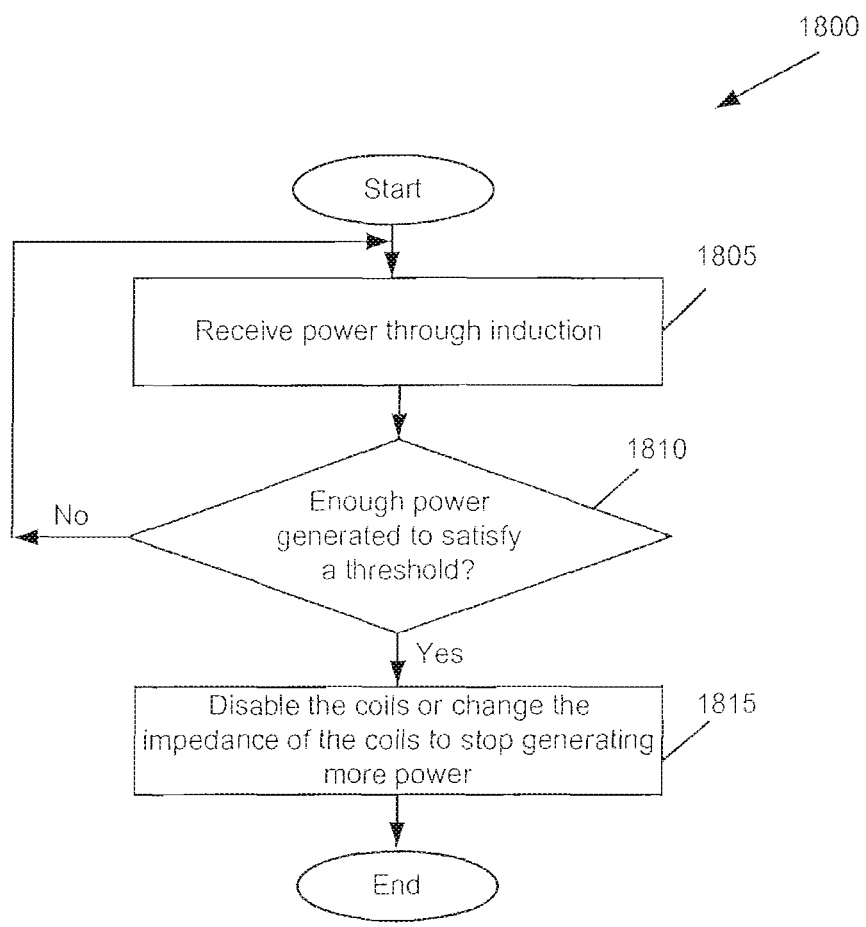
FIG. 18 conceptually illustrates a process for terminating power generation in the slave in some embodiments of the invention.

FIG. 18 conceptually illustrates a process 1800 for terminating power generation in the slave in some embodiments of the invention. As shown, the process receives (at 1800) power through the induction. Next, the process determines whether enough power is generated to satisfy a certain threshold. For instance, the process determines whether a battery or a capacitor in the slave is charged to a certain voltage level.

When the generated power does satisfy the threshold, the process proceeds to 1805 to continue receiving power through induction. Otherwise, the process either disables the coils (e.g., by turn a switch on or off) or changes the coils impedances as a signal to the master device to stop transmitting induction power. The process then exits. Some embodiments use a similar process to terminate generation of power through conversation of RF energy using a similar process as process 1800. In some of these embodiments, the slave's voltage converter 477 is disconnected from the slave's power generator 473 antennas is disconnected from the slave's power transceiver. In other embodiments, the slave's antennas 499 are turned off.

Figure 19:
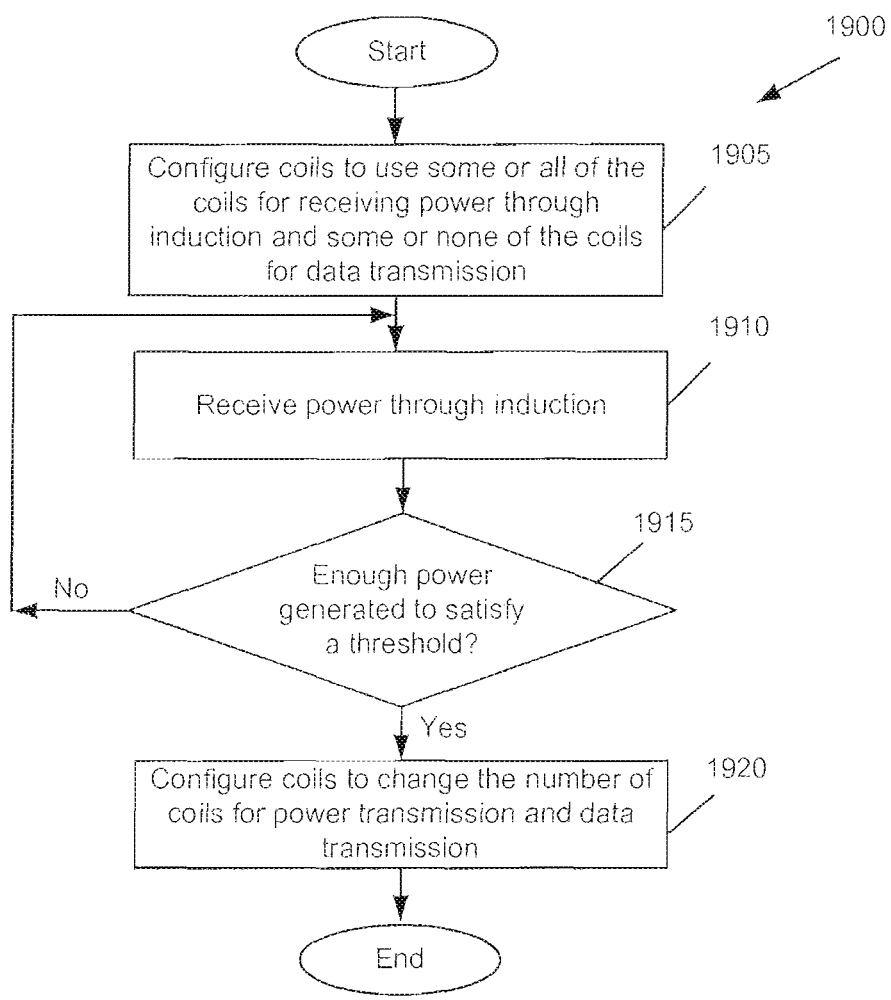
FIG. 19 conceptually illustrates a process for configuring the slave's coils for either power generation or data transmission in some embodiments of the invention.

FIG. 19 conceptually illustrates a process 1900 for configuring the slave's coils for either power generation or data transmission in some embodiments of the invention. As shown, the process configures (at 1905) salve's coils to use some or all of the coils for receiving power through induction and some or none of the coils for data transmission.

Next, the process receives (at 1910) power through induction at the slave's coils. Next, the process determines (at 1915) whether enough power is generated at the slave to satisfy a certain threshold. For instance, the process determines whether a battery or a capacitor in the slave is charged to a certain voltage level. When the generated power has not satisfied the threshold, the process proceeds to 1910 to receive more induction power. Otherwise, the process reconfigures the coils that are used for power generation and data transmission. For instance, when the power in slave reaches a maximum threshold, no coils are used for power generation and some or all coils are used for data transmission. As another example, when the power reaches a certain threshold, the number of coils used for data transmission is increased and the number of coils used for power generation is decreased. In this example, power generation through induction continues until the power level reaches a maximum threshold.

IV. Charging with Both RF and Induction in a Hybrid Configuration

Although the embodiments discussed by reference to FIGS. 1-19 described masters with either coils or RF antennas, the invention is not restricted to these embodiments. Specifically, in some embodiments, both the master and the slave have induction coils and RF antennas.

For instance, in some embodiments a master as shown in FIGS. 1-4 and 6-9 in addition to RF antennas has coils and associated circuitry as shown to any of FIGS. 10-14. Also, in some embodiments a slave as shown in FIGS. 1-4 and 7 in addition to RF antennas has coils and associated circuitry as shown in FIGS. 12-16. Because the induction frequency and RF frequencies are far apart, each element (i.e. each master and slave element) is calibrated to have two different operating frequencies, one for induction and one for RF.

Figure 20:
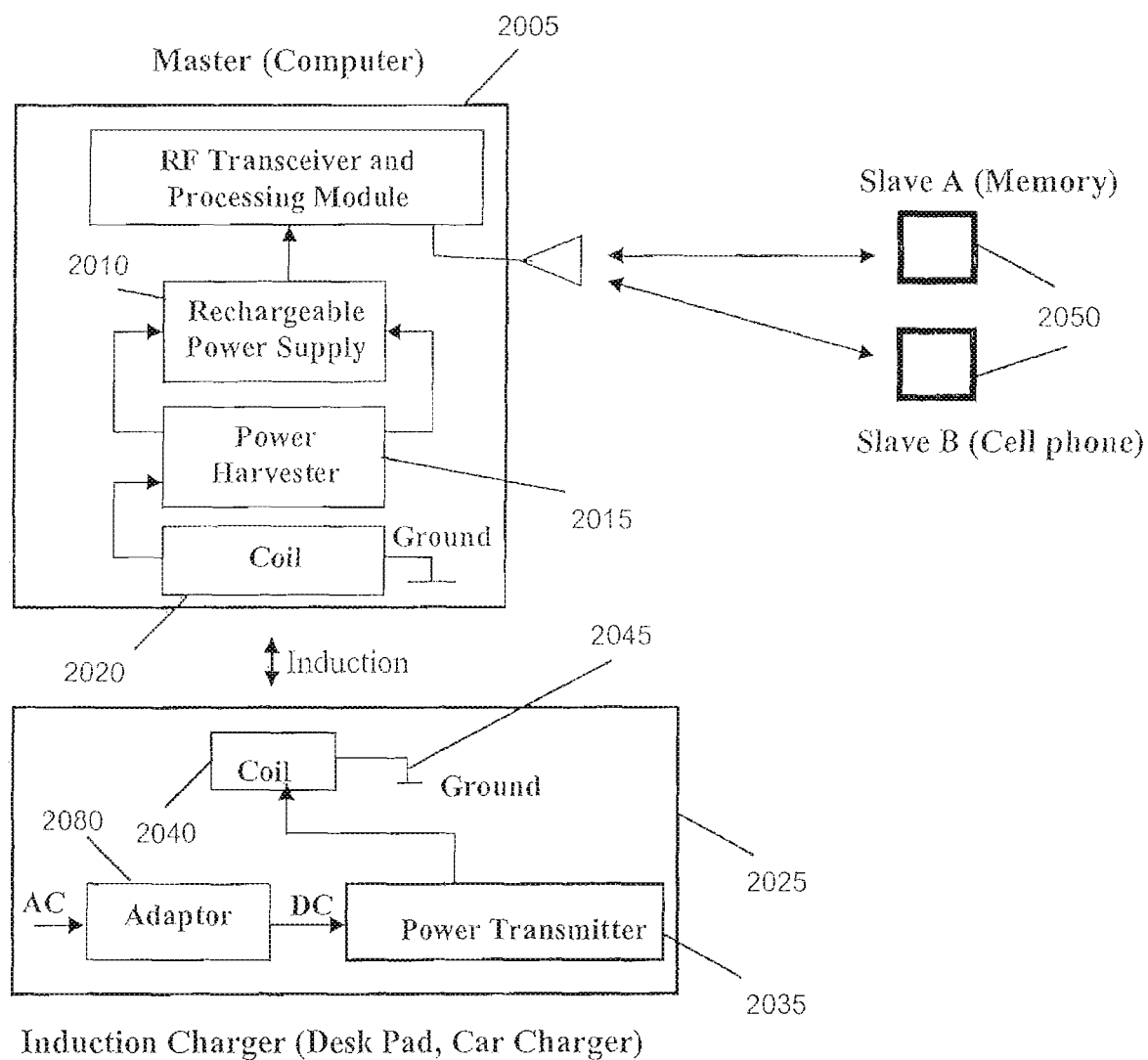
FIG. 20 conceptually illustrates a hybrid system of some embodiments of the invention where the master uses an induction charger as a power source to power itself and then uses a high frequency directional and focused RF beam to power up one or more slave devices and communicate with them.

FIG. 20 conceptually illustrates a hybrid system of some embodiments of the invention where the master uses an induction charger as a power source to power itself and then uses a high frequency directional and focused RF beam to power up one or more slave devices and communicate with them. As shown, the master 2005 includes a rechargeable power supply 2010, a power harvester 2015 and a coil 2020. The induction charger 2025 has a power source (AC power, battery, etc). The power is connected to the induction charger's power transmitter 2035 (e.g., after an AC source is converted to DC through an adaptor 2080), which is connected to a primary coil 2040 with a reference ground point 2045. When the master's secondary coil is close to the charger's primary coil it receives power through inductance and its power harvester 2015 charges the master's rechargeable power supply 2010. The master then uses a high frequency directional RF beam to power up one or more slave devices 2050 (or charge the slave device's battery if it has one) and communicates with it, as discussed by reference to FIG. 2-4. FIG. 20 shows only one embodiment of induction charging, and there are other implementations and methods as discussed herein.

Figure 21:
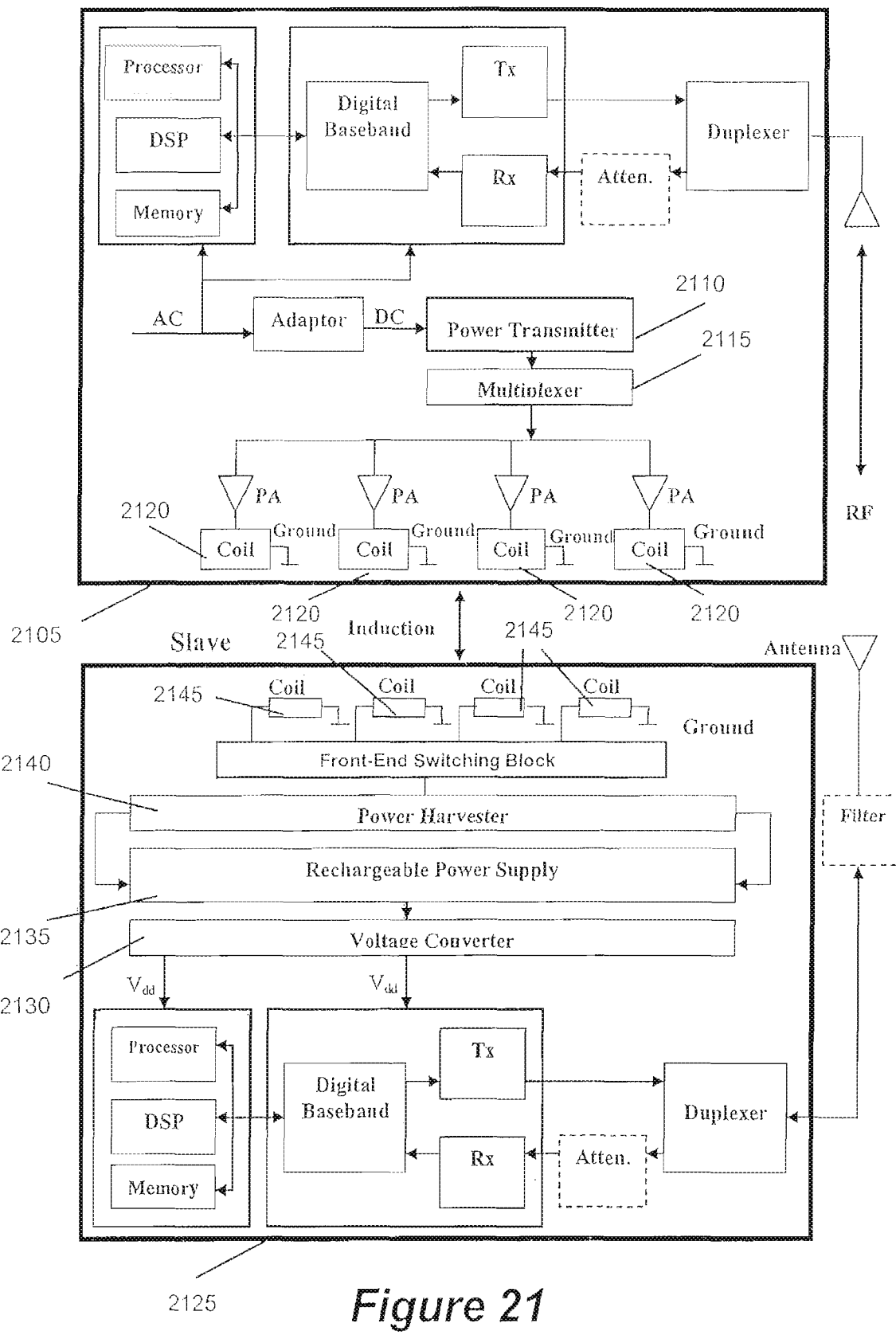
FIG. 21 conceptually illustrates a master in some embodiments of the invention that acts as an induction charger and uses induction to charge the slave before using its high frequency directional beam to communicate with the slave.

FIG. 21 conceptually illustrates a master in some embodiments of the invention that acts as an induction charger and uses induction to charge the slave before using its high frequency directional beam to communicate with the slave. The master 2105 has access to power (AC power or battery). The master's power is connected to a power transmitter 2110 that uses a multiplexer 2115 to power a matrix of coils 2120. This is similar to the arrangement shown in FIG. 13, although each coil or a subset of coils may also have their own individual power transmitters (as in FIG. 12). The slave 2125 includes a voltage converter 2130, a rechargeable power supply 2135, a power harvester 2140, a matrix of coils 2145 and other blocks of FIG. 16 that are not shown for simplicity (e.g. calibration and configuration block). When the master's primary coils are close to the slave's coils the slave receives power through inductance. The master then uses a high frequency directional RF beam to communicate with the slave. FIG. 21 shows only one embodiment of induction charging, and there are other implementations and methods as discussed herein.

Figure 22:
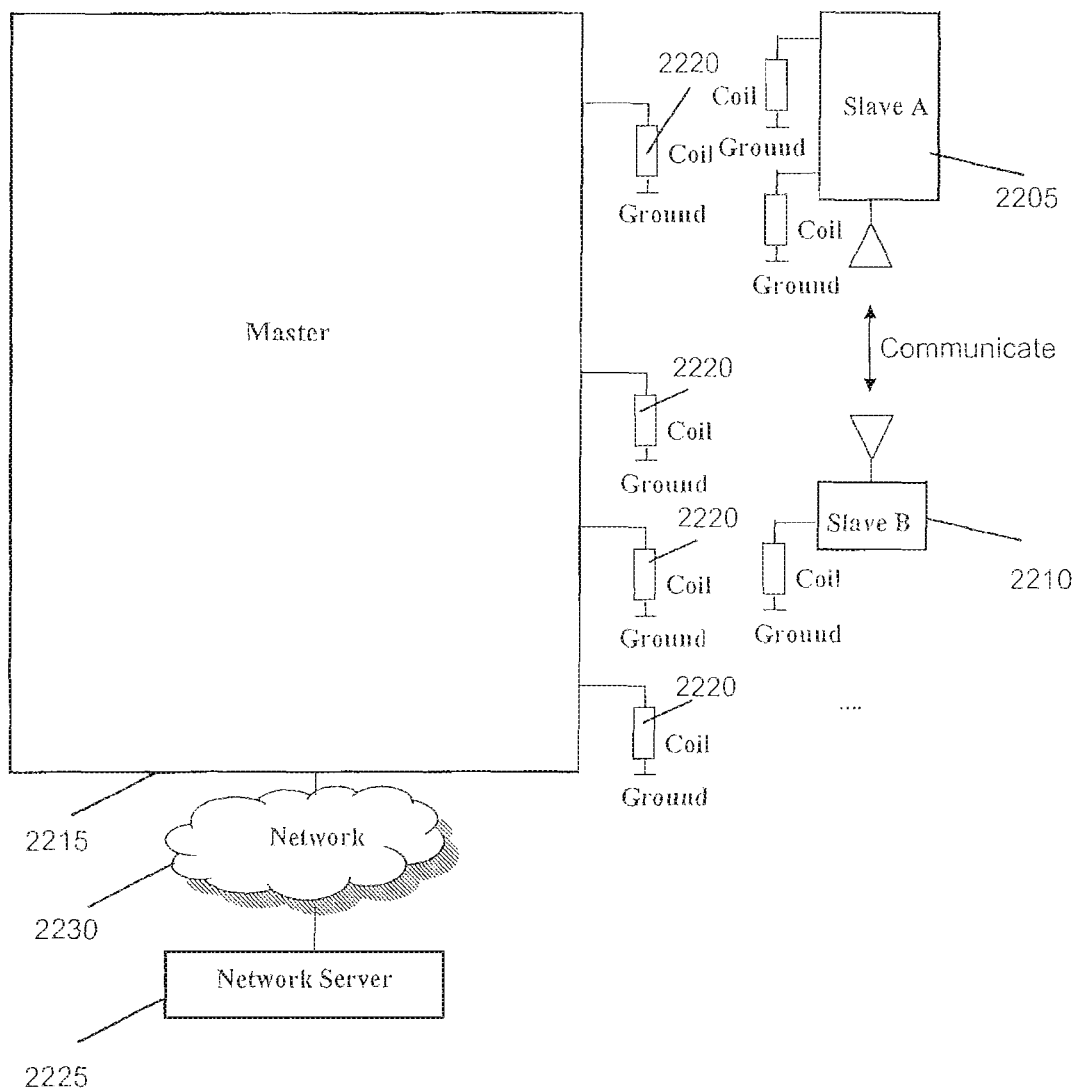
FIG. 22 conceptually illustrates two slaves in some embodiments of the invention that use the power of a master's coils to power up or charge their batteries and then communicate with each other using their communication transceivers.

FIG. 22 conceptually illustrates two slaves in some embodiments of the invention that use the power of a master's coils to power up or charge their batteries and then communicate with each other using their communication transceivers. As shown, the two slaves 2205 and 2210 are placed on or near a master 2215 induction charger. An example of such an embodiment (without any limitations) is: slave A 2205 is a cell phone, slave 2 2210 is a memory stick with data, and the master is a PC with an induction pad. The two slaves use the power of the master's coils 2220 to power-up or charge their batteries (not shown). The two slaves then use their RF transceiver (not shown) with directional beams (or any other communication transceiver) to communicate directly with each other. In other embodiments, the two slaves use the master and induction coupling to communicate with each other. For instance, where one or both of the slaves do not have an RF communication transceiver and slave A wants to communicate with stave B, Slave A uses induction coupling with the master to send its request for slave B to the master. The master uses induction coupling to communicate that request to slave B. Slave B then uses induction coupling to reply to the master, and the master uses induction coupling to forward the reply to slave A. In some embodiments more than two slaves get charged and communicate with each other. A network server 2225 in some embodiments controls the master and the slaves through a network 2230.

The description so far has discussed induction charging and focused RF beam as separate embodiments. FIG. 21 did discuss a master that uses induction for charging and RF for communication. That role is reversed in some embodiments of the invention where RF is used for charging and induction is used for communication. But it is possible to view the coil and the RF antennas as elements. In some embodiments one element is designed for the master, slave or both so that at low frequencies the element is like a coil inductor and at high frequencies it is like an antenna. This means that at the same time one has RF power and induction power. Low frequencies mean big coils and high frequencies mean small coils. If the distance is far enough (e.g., more than 2-3 wavelengths) compared to the signal wavelength then waves are created and the element is used for RF. If the distance is short then waves cannot be created and it will be more like induction. So distance is used to select one mode or the mode is chosen automatically. In other embodiments the master, slave or both have two different elements for different distances (one for short distances and one for far distances). In these embodiments, the master does time multiplexing between the two or select one over the other. This depends on the slave and whether it has each element for induction and RF antenna. If the master is charging and communicating with a group of antennas then the selection of induction or RF depends on the configuration of the slaves as to which ones have induction, antenna or both.

Figure 23:
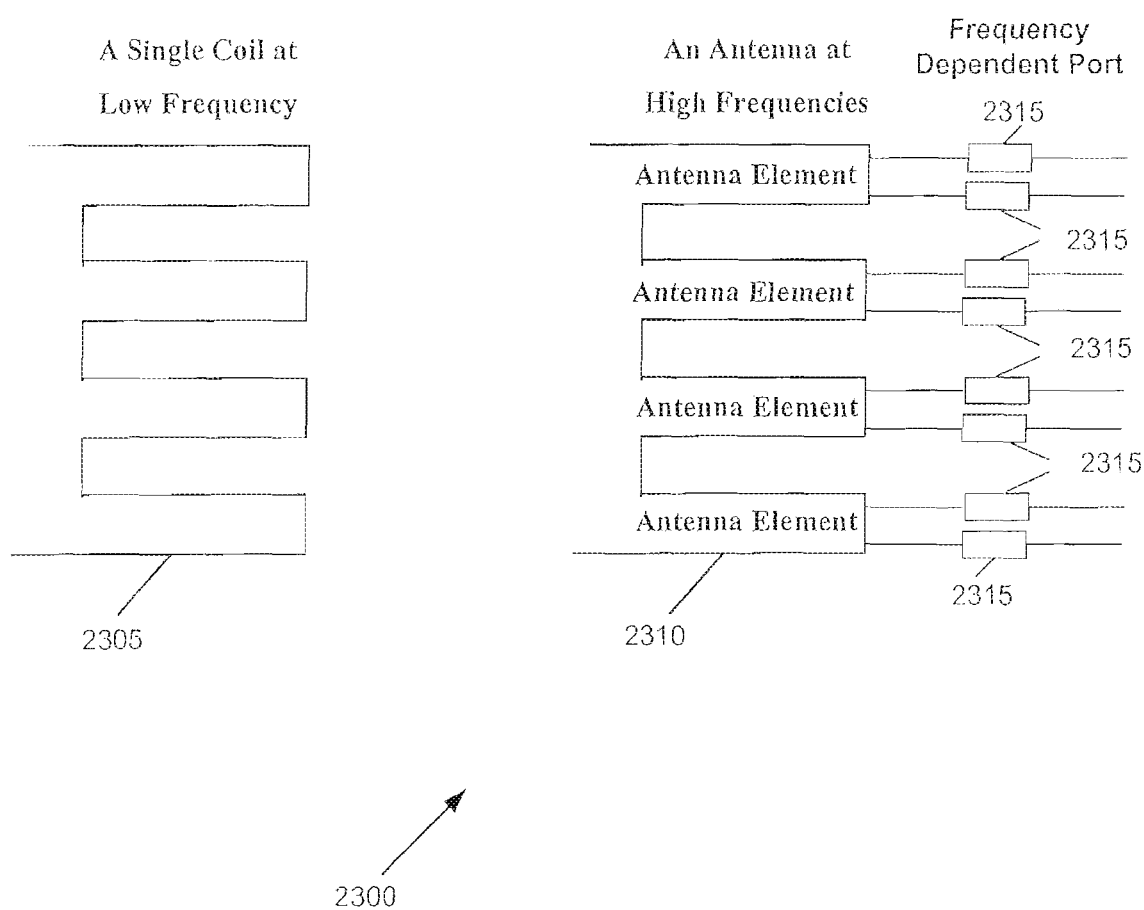
FIG. 23 conceptually illustrates an element in some embodiments of the invention that is designed to be a coil at low frequencies and a multiple antenna at high frequencies with beam forming capabilities.

FIG. 23 conceptually illustrates an element 2300 in some embodiments of the invention that is designed to be a single coil 2305 at low frequencies and a multiple antenna sub-elements 2310 at high frequencies with beam forming capabilities. The element in some embodiments physically resembles a coil. In some embodiments, the length of the coil is much bigger than the size of antenna required for RF at high frequencies. For instance in the frequency range of 50-60 GHz the element is of the order of centimeters, whereas the antenna sub-elements are of the order of millimeters. The element is divided into multiple RF antennas sub-elements and these multiple antenna sub-elements are used to do beam forming. Each sub-element is of the order of half a wavelength or less and operates at two separate frequencies, one lower frequency for the coil 2305 and one higher frequency for the antenna 2310. Each sub-element has an associated port 2315 that is frequency dependent (e.g. a capacitor or an LC circuit) such that at high frequency the sub-element acts as an antenna, but at low frequencies the sub-elements act as one connected coil. In FIG. 23, these ports 2315 are not shown for the low frequency operation to emphasize that the element 2300 acts as a single coil 2305 in low frequencies. All of the discussions throughout this specification regarding slave and master configuration and control and communication apply to embodiments that use the element shown in FIG. 23. For instance, in some embodiments, the element is used in one or more of the master and slave devices shown in FIGS. 1-4, 6-14, 16, and 20-22. Also, one of the antennas 2300 is used for control and communication in some embodiments. In other embodiments, all antennas are used for control, communication and power. If low frequency and high frequency are used at the same time the communication channel in some embodiments is RF or induction or both.

V. Computer System

Many of the above-described processes and modules are implemented as software processes that are specified as a set of instructions recorded on a computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Cate Arrays ("FPGA"). The execution of these instructions causes the set of computational elements to perform the actions indicated in the instructions. Computer is meant in its broadest sense, and can include any electronic device with a processor (e.g., moving scanner, mobile device, access point, etc.). Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 24:
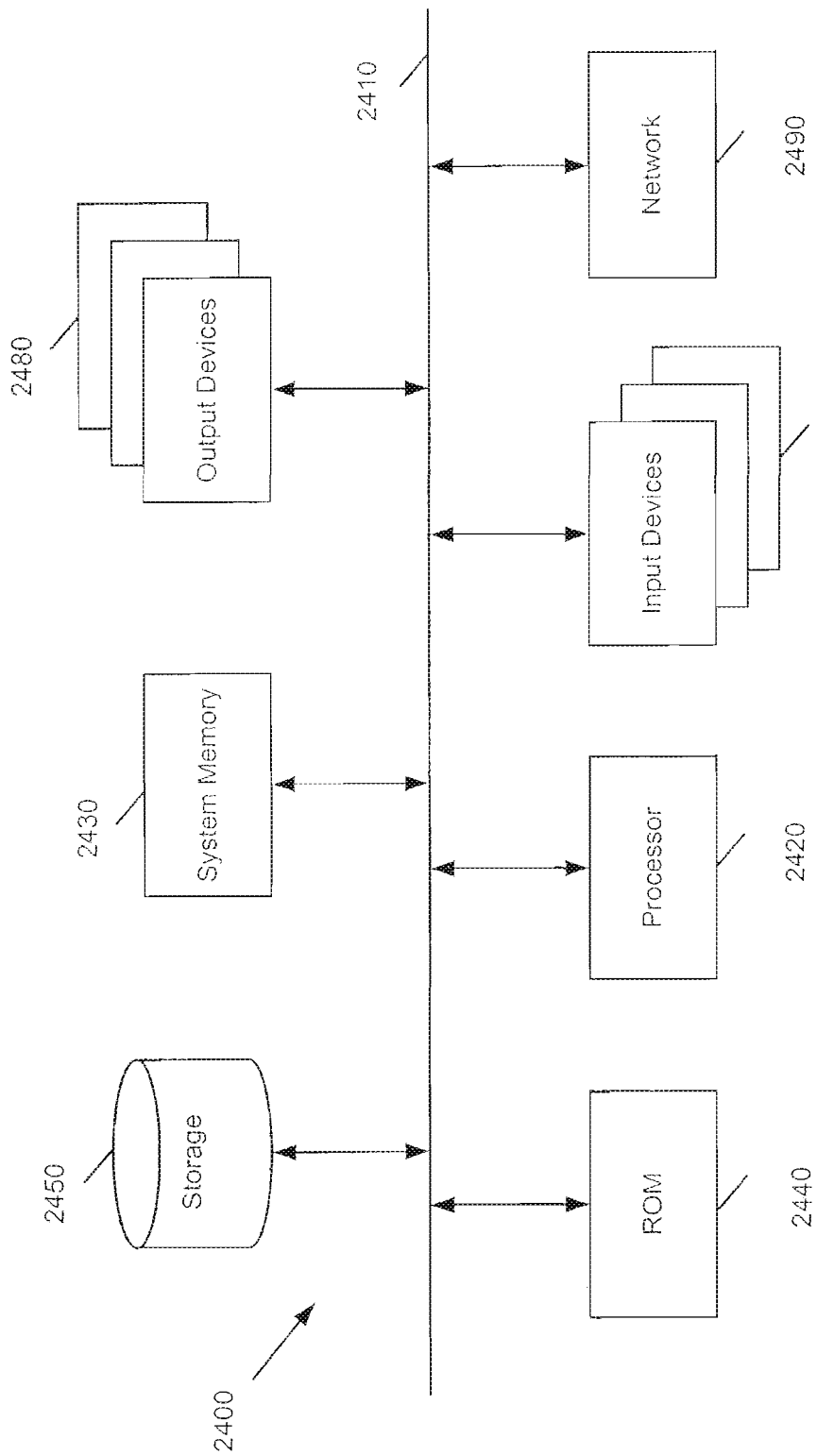
FIG. 24 conceptually illustrates a computer system with which some embodiments of the invention are implemented.

FIG. 24 conceptually illustrates a computer system 2400 with which some embodiments of the invention are implemented. For example, the masters, slaves, network servers, access points, and processes described above by reference to FIGS. 1-23 may be at least partially implemented using sets of instructions that are run on the computer system 2400.

Such a computer system includes various types of computer readable mediums and interfaces for various other types of computer readable mediums. Computer system 2400 includes a bus 2410, at least one processing unit (e.g., a processor) 2420, a system memory 2430, a read-only memory (ROM) 2440, a permanent storage device 2450, input devices 2470, output devices 2480, and a network connection 2490. The components of the computer system 2400 are electronic devices that automatically perform operations based on digital and/or analog input signals. The various examples of user inputs described above may be at least partially implemented using sets of instructions that are run on the computer system 2400 and displayed using the output devices 2480.

One of ordinary skill in the art will recognize that the computer system 2400 may be embodied in other specific forms without deviating from the spirit of the invention. For instance, the computer system may be implemented using various specific devices either alone or in combination. For example, a local Personal Computer (PC) may include the input devices 2470 and output devices 2480, while a remote PC may include the other devices 2410-2450, with the local PC connected to the remote PC through a network that the local PC accesses through its network connection 2490 (where the remote PC is also connected to the network through a network connection).

The bus 2410 collectively represents all system, peripheral, and chipset buses that communicatively connect the numerous internal devices of the computer system 2400. In some cases, the bus 2410 may include wireless and/or optical communication pathways in addition to or in place of wired connections. For example, the input devices 2470 and/or output devices 2480 may be coupled to the system 2400 using a wireless local area network (W-LAN) connection, Bluetooth®, or some other wireless connection protocol or system.

The bus 2410 communicatively connects, for example, the processor 2420 with the system memory 2430, the ROM 2440, and the permanent storage device 2450. From these various memory units, the processor 2420 retrieves instructions to execute and data to process in order to execute the processes of some embodiments. In some embodiments the processor includes an FPGA, an ASIC, or various other electronic components for execution instructions.

The ROM 2440 stores static data and instructions that are needed by the processor 2420 and other modules of the computer system. The permanent storage device 2450, on the other hand, is a read-and-write memory device. This device is a non-volatile memory unit that stores instructions and data even when the computer system 2400 is off. Some embodiments of the invention use a mass-storage device (such as a magnetic or optical disk and its corresponding disk drive) as the permanent storage device 2450.

Other embodiments use a removable storage device (such as a floppy disk, flash drive, or CD-ROM) as the permanent storage device. Like the permanent storage device 2450, the system memory 2430 is a read-and-write memory device. However, unlike storage device 2450, the system memory 2430 is a volatile read-and-write memory, such as a random access memory (RAM). The system memory stores some of the instructions and data that the processor needs at runtime.

In some embodiments, the sets of instructions and/or data used to implement the invention's processes are stored in the system memory 2430, the permanent storage device 2450, and/or the read-only memory 2440. For example, the various memory units include instructions for processing multimedia items in accordance with some embodiments.

The bus 2410 also connects to the input devices 2470 and output devices 2480. The input devices 2470 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2480 include printers, electronic display devices that display still or moving images, and electronic audio devices that play audio generated by the computer system. For instance, these display devices may display a graphical user interface (GUI). The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 24, bus 2410 also couples computer 2400 to a network 2490 through a network adapter (not shown). In this manner, the computer can be a part of a network of computers (such as a local area network ("LAN"), a wide area network ("WAN"), an Intranet, or a network of networks, such as the Internet. For example, the computer 2400 may be coupled to a web server (network 2490) so that a web browser executing on the computer 2400 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computer system", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium", "computer readable media", "machine readable medium", and "machine readable media" are entirely restricted to non-transitory, tangible, physical objects that store information in a form that is readable by a computer. These terms exclude any wireless signals, wired download signals, and/or any other ephemeral signals.

It should be recognized by one of ordinary skill in the art that any or all of the components of computer system 2400 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks, one of ordinary skill in the art would recognize that some embodiments may combine these modules into a single functional block or element. One of ordinary skill in the art would also recognize that some embodiments may divide a particular module into multiple modules. Furthermore, specific details (such as details shown in FIGS. 1-23) are given as an example and it is possible to use different circuit implementations to achieve the same results without deviating from the teachings of the invention. The words "embodiment" and "embodiments" are used throughout this specification to refer to the embodiments of the current invention.

One of ordinary skill in the art would understand that the invention is not to be limited by the foregoing illustrative details, but rather is to be defined by the appended claims.

What is claimed is:

1. A battery-operated device comprising:
    a battery;
    an electronic circuitry configured to be powered by the battery; and
    a converter configured to receive energy from any of a plurality of authorized chargers, and generate power from the energy for charging the battery using the power;
    the battery-operated device configured to:
        receive a charger identification from a charger;
        determine whether the charger identification is in a list of charger identifications belonging to the plurality of authorized chargers;
        in response to determining that the charger identification is in the list of charger identifications:
            receive the energy from the charger;
            generate, using the converter, the power from the energy received from the charger;
            charge the battery using the power received from the converter; and
            use the battery to power the electronic circuitry.

2. The battery-operated device of claim 1 further comprising:

a coil configured to receive the energy by induction from the charger.

3. The battery-operated device of claim 2 further comprising:
a memory;
wherein the battery-operated device is further configured to store the list of charger identifications in the memory.

4. The battery-operated device of claim 2 further configured to:
in response to determining that the charger identification is not in the list of charger identifications, prevent charging of the battery by the charger.

5. The battery-operated device of claim 2, wherein the charger identification is one of a MAC ID, an IP address, a name, a serial number, a product name, or a manufacturer name.

6. The battery-operated device of claim 2, wherein the charger identification indicates one or more capabilities of the charger.

7. The battery-operated device of claim 2 further comprising:
a capacitor, wherein the converter is configured to store the power in the capacitor.

8. The battery-operated device of claim 2 further configured to:
use a same channel for receiving, from the charger, both the energy and the charger identification.

9. The battery-operated device of claim 2 further configured to:
use a first channel for receiving the energy from the charger;
use a second channel for receiving the charger identification from the charger;
wherein the first channel is different than the second channel.

10. The battery-operated device of claim 1 further comprising:
an antenna configured to receive radio frequency (RF) energy from the charger for conversion to the power by the converter for charging the battery.

11. A method of charging a battery-operated device including a battery, an electronic circuitry configured to be powered by the battery, and a converter configured to receive energy from any of a plurality of authorized chargers, and generate power from the energy for charging the battery using the power, the method comprising:
receiving a charger identification from a charger;
determining whether the charger identification is in a list of charger identifications belonging to the plurality of authorized chargers;
in response to determining that the charger identification is in the list of charger identifications:
receiving the energy from the charger;
generating, using the converter, the power from the energy received from the charger;
charging the battery using the power received from the converter; and
using the battery to power the electronic circuitry.

12. The method of claim 11, wherein the battery-operated device further includes a coil, and wherein the method further comprises:
receiving, using the coil, the energy by induction from the charger.

13. The method of claim 12, wherein the battery-operated device further includes a memory having the list of charger identifications stored therein.

14. The method of claim 12 further comprising:
in response to determining that the charger identification is not in the list of charger identifications, preventing charging of the battery by the charger.

15. The method of claim 12, wherein the charger identification is one of a MAC ID, an IP address, a name, a serial number, a product name, or a manufacturer name.

16. The method of claim 12, wherein the charger identification indicates one or more capabilities of the charger.

17. The method of claim 12, wherein the battery-operated device further includes a capacitor, and wherein the method further comprises:
storing, by the converter, the power in the capacitor.

18. The method of claim 12 further comprising:
using a same channel for receiving, from the charger, both the energy and the charger identification.

19. The method of claim 12 further comprising:
using a first channel for receiving the energy from the charger;
using a second channel for receiving the charger identification from the charger;
wherein the first channel is different than the second channel.

20. The method of claim 11, wherein the battery-operated device further includes an antenna, and wherein the method further comprises:
receiving, using the antenna, radio frequency (RF) energy from the charger for conversion to the power by the converter for charging the battery.

* * * * *